United States Patent
Roup et al.

(10) Patent No.: US 12,165,526 B1
(45) Date of Patent: Dec. 10, 2024

(54) SYSTEM AND METHOD FOR PROVIDING MANEUVERING BEHAVIORS TO A VEHICLE USING MANEUVER PRIMITIVES

(71) Applicant: Rockwell Collins, Inc., Cedar Rapids, IA (US)

(72) Inventors: Alexander V. Roup, Centreville, VA (US); Bryan M. Krawiec, Ashburn, VA (US); Angus L. McLean, Bradenton, FL (US); Vladislav Gavrilets, Mclean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 40 days.

(21) Appl. No.: 17/131,401

(22) Filed: Dec. 22, 2020

(51) Int. Cl.
*G08G 5/00* (2006.01)
*G05D 1/00* (2024.01)

(52) U.S. Cl.
CPC .......... *G08G 5/003* (2013.01); *G05D 1/0022* (2013.01); *G05D 1/104* (2013.01); *G05D 1/106* (2019.05); *G08G 5/0008* (2013.01)

(58) Field of Classification Search
CPC ...... G08G 5/003; G08G 5/0008; G05D 1/106; G05D 1/0022; G05D 1/104
See application file for complete search history.

(56) References Cited

U.S. PATENT DOCUMENTS

| | | | |
|---|---|---|---|
| 6,963,795 B2 | 11/2005 | Haissig et al. | |
| 7,024,309 B2 | 4/2006 | Doane | |
| 7,272,472 B1 | 9/2007 | McElreath | |
| 7,451,023 B2 | 11/2008 | Appleby et al. | |
| 7,734,386 B2 | 6/2010 | DelNero et al. | |

(Continued)

FOREIGN PATENT DOCUMENTS

| | | | |
|---|---|---|---|
| CN | 106468919 A | 3/2017 | |
| CN | 107289942 A | 10/2017 | |

(Continued)

OTHER PUBLICATIONS

Park, Autonomous aerobatics on command path, 2012, Elsevier, Aerospace Science and Technology, 22, p. 64-74 (Year: 2012).*

(Continued)

*Primary Examiner* — Anne Marie Antonucci
*Assistant Examiner* — Patrick M Brady
(74) *Attorney, Agent, or Firm* — Suiter Swantz IP

(57) ABSTRACT

A system for providing maneuvering behaviors to a vehicle is disclosed. The system may include one or more controllers communicatively coupled to one or more vehicles. The one or more controllers may include one or more processors configured to execute one or more program instructions causing the one or more processors to: initiate one or more maneuver primitives in response to decision engine selection; receive a plurality of input parameters for the one or more maneuver primitives, the plurality of input parameters including one or more initialization definition input parameters, one or more goal definition input parameters, one or more navigation state input parameters, one or more design input parameters, and one or more vehicle performance envelope input parameters; and generate one or more control signals at one or more predetermined intervals of time to maneuver the one or more vehicles based on the decision engine selection.

12 Claims, 13 Drawing Sheets

(56) References Cited

U.S. PATENT DOCUMENTS

| | | |
|---|---|---|
| 8,463,463 B1 | 6/2013 | Feldmann et al. |
| 9,355,564 B1 | 5/2016 | Tyson et al. |
| 10,394,243 B1* | 8/2019 | Ramezani ............ B60W 30/10 |
| 10,678,253 B2 | 6/2020 | Zeng et al. |
| 2010/0292874 A1* | 11/2010 | Duggan ............... G05D 1/0061 |
| | | 701/11 |
| 2015/0203215 A1* | 7/2015 | Falangas ................ G06F 30/20 |
| | | 703/2 |
| 2017/0092135 A1* | 3/2017 | Hardt ................... G08G 5/0017 |
| 2017/0277203 A1 | 9/2017 | Castillo-Effen et al. |
| 2019/0004544 A1 | 1/2019 | Feldmann et al. |
| 2019/0324456 A1 | 10/2019 | Ryan et al. |
| 2019/0361439 A1 | 11/2019 | Zeng et al. |
| 2020/0174502 A1 | 6/2020 | Roger et al. |
| 2020/0327814 A1* | 10/2020 | Adolf .................. B64C 29/0025 |
| 2021/0197966 A1* | 7/2021 | Zhang ................. G08G 5/0078 |

FOREIGN PATENT DOCUMENTS

| | | |
|---|---|---|
| CN | 108829133 A | 11/2018 |
| CN | 110849360 A | 2/2020 |
| WO | 2018028358 A1 | 2/2018 |

OTHER PUBLICATIONS

Cho et al., Three-Dimensional Nonlinear Differential Geometric Path-Following Guidance Law, Journal of Guidance, Control, and Dynamics, vol. 38, No. 12, Dec. 2015 (Year: 2015).*

Frazzoli, Maneuver-Based Motion Planning for Nonlinear Systems With Symmetries, IEEE Transactions on Robotics, vol. 21, No. 6, Dec. 2005 (Year: 2005).*

Maneuver-Based Motion Planning for Nonlinear Systems With Symmetries (Year: 2005).*

Three-Dimensional Nonlinear Differential Geometric Path-Following Guidance Law (Year: 2015).*

Autonomous aerobatics on commanded path (Year: 2012).*

Park, Sanghyuk et al., "A New Nonlinear Guidance Logic for Trajectory Tracking", American Institute of Aeronautics and Astronautics, Printed Oct. 29, 2020, 16 pages.

* cited by examiner

SYSTEM AND METHOD FOR PROVIDING MANEUVERING BEHAVIORS TO A VEHICLE USING MANEUVER PRIMITIVES

GOVERNMENT SUPPORT

This technology was developed with U.S. government support under ARC-2019-S-19003 awarded by SPG Institute, Inc. The U.S. government has certain rights in this invention.

BACKGROUND

Relative maneuvering is a foundational skill in both autonomous aerial systems and manned aerial systems. Current flight control systems and integrated software solutions are well equipped with single vehicle path definition, guidance, and control functions. However, current systems are very limited in their use of the vehicle's performance envelope.

SUMMARY

A system is disclosed, in accordance with one or more embodiments of the disclosure. In one embodiment, the system includes one or more controllers communicatively coupled to one or more vehicles, the one or more controllers including one or more processors configured to execute one or more program instructions causing the one or more processors to: initiate one or more maneuver primitives stored in memory in response to a selection by a decision engine, the decision engine configured to select a maneuver primitive of the one or more maneuver primitives for the one or more vehicles to execute; receive a plurality of input parameters for the one or more maneuver primitives, the plurality of input parameters including one or more initialization definition input parameters, one or more goal definition input parameters, one or more navigation state input parameters, one or more design input parameters, and one or more vehicle performance envelope input parameters; and generate one or more trajectory control signals at one or more predetermined intervals of time, the one or more trajectory control signals configured to maneuver the one or more vehicles based on the decision engine selection.

In some embodiments, the one or more maneuver primitives may include one or more absolute maneuver primitives.

In some embodiments, the one or more absolute maneuver primitives may include at least of: fly to latitude waypoint, fly to longitude waypoint, loiter, or hover.

In some embodiments, the one or more maneuver primitives may include one or more relative maneuver primitives.

In some embodiments, the one or more absolute maneuver primitives may include at least of: far field pursuit, planned trajectory rendezvous, local level pursuit, in plane pursuit, or out of plane pursuit.

In some embodiments, the one or more controllers may be further configured to: determine a plane of motion and turn circle for each reference trajectory of one or more reference trajectories, the plane of motion of each reference trajectory of the one or more reference trajectories including a current position of the reference trajectory, the plane of motion aligned to the orientation of a current velocity of the reference trajectory, and the plane of motion aligned to the orientation of a current acceleration of the reference trajectory, the turn circle of each reference trajectory of the one or more reference trajectories embedded within the plane of motion of the one or more reference trajectories, the turn circle of each reference trajectory of the one or more reference trajectories aligned with the current position of the reference trajectory, the turn circle of each reference trajectory of the one or more reference trajectories tangential to the current velocity of the reference trajectory, the turn circle of each reference trajectory of the one or more reference trajectories aligned with curvature matching the reference trajectory; filter the plane of motion of each reference trajectory of the one or more reference trajectories using a filtering model configured to eliminate unnecessary rotation of the plane of motion; and determine one or more offset planes of motion and turn circles, the one or more offset planes of motion and turn circles including an offset to a goal position, the one or more offset planes of motion and turn circles including an offset to a guidance offset determined by the one or more controllers, the one or more offset planes of motion and turn circles further including an offset to the vehicle.

In some embodiments, the one or more controllers may be further configured to guide the vehicle using a three-dimensional non-linear guidance logic, the three-dimensional non-linear guidance logic configured to operate in three dimensions of position, the three dimensional non-linear guidance logic configured to utilize all possible position values of at least one of the vehicle or the one or more reference trajectories, the three-dimensional non-linear guidance logic configured to use the one or more offset planes of motion and turn circles.

In some embodiments, the one or more controllers may be further configured to guide the vehicle using an axial guidance logic, the axial guidance logic configured to influence the position of the vehicle in a forward to aft dimension relative to the one or more reference trajectories, the axial guidance logic configured to use at least one of a commanded speed, a guidance offset perpendicular to the velocity of the one or more reference trajectories within the plane of motion, a guidance offset perpendicular to the velocity of the one or more reference trajectories and perpendicular to the plane of motion, or a guidance offset perpendicular to the velocity of the one or more reference trajectories and perpendicular to the plane of motion.

A method is disclosed, in accordance with one or more embodiments of the disclosure. In one embodiment, the method includes, but is not limited to, initiating one or more maneuver primitives stored in memory in response to a selection by a decision engine, the decision engine configured to select a maneuver primitive of the one or more maneuver primitives for the one or more vehicles to execute. In another embodiment, the method includes, but is not limited to, receiving a plurality of input parameters for the one or more maneuver primitives in response to the decision engine selection, the plurality of input parameters including one or more initialization definition input parameters, one or more goal definition input parameters, one or more navigation state input parameters, one or more design input parameters, and one or more controlled vehicle performance envelope input parameters. In another embodiment, the method includes, but is not limited to, generating one or more trajectory control signals at one or more predetermined intervals of time, the one or more trajectory control signals configured to maneuver the one or more vehicles based on the decision engine selection.

In some embodiments, the one or more maneuver primitives may include one or more absolute maneuver primitives.

In some embodiments, the one or more maneuver primitives may include one or more relative maneuver primitives.

In some embodiments, the one or more absolute maneuver primitives may include at least one of: far field pursuit, planned trajectory rendezvous, local level pursuit, in plane pursuit, or out of plane pursuit.

In some embodiments, the one or more controllers may be further configured to: determine a plane of motion and turn circle for each reference trajectory of one or more reference trajectories, the plane of motion of each reference trajectory of the one or more reference trajectories including a current position of the reference trajectory, the plane of motion aligned to the orientation of a current velocity of the reference trajectory, and the plane of motion aligned to the orientation of a current acceleration of the reference trajectory, the turn circle of each reference trajectory of the one or more reference trajectories embedded within the plane of motion of the one or more reference trajectories, the turn circle of each reference trajectory of the one or more reference trajectories aligned with the current position of the reference trajectory, the turn circle of each reference trajectory of the one or more reference trajectories tangential to the current velocity of the reference trajectory, the turn circle of each reference trajectory of the one or more reference trajectories aligned with curvature matching the reference trajectory; filter the plane of motion of each reference trajectory of the one or more reference trajectories using a filtering model configured to eliminate unnecessary rotation of the plane of motion; and determine one or more offset planes of motion and turn circles, the one or more offset planes of motion and turn circles including an offset to a goal position, the one or more offset planes of motion and turn circles including an offset to a guidance offset determined by the one or more controllers, the one or more offset planes of motion and turn circles further including an offset to the vehicle.

In some embodiments, the one or more controllers may be further configured to guide the vehicle using a three-dimensional non-linear guidance logic, the three-dimensional non-linear guidance logic configured to operate in three dimensions of position, the three dimensional non-linear guidance logic configured to utilize all possible position values of at least one of the vehicle or the one or more reference trajectories, the three-dimensional non-linear guidance logic configured to use the one or more offset planes of motion and turn circles.

In some embodiments, the one or more controllers may be further configured to guide the vehicle using an axial guidance logic, the axial guidance logic configured to influence the position of the vehicle in a forward to aft dimension relative to the one or more reference trajectories, the axial guidance logic configured to use at least one of a commanded speed, a guidance offset perpendicular to the velocity of the one or more reference trajectories within the plane of motion, a guidance offset perpendicular to the velocity of the one or more reference trajectories and perpendicular to the plane of motion, or a guidance offset perpendicular to the velocity of the one or more reference trajectories and perpendicular to the plane of motion.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
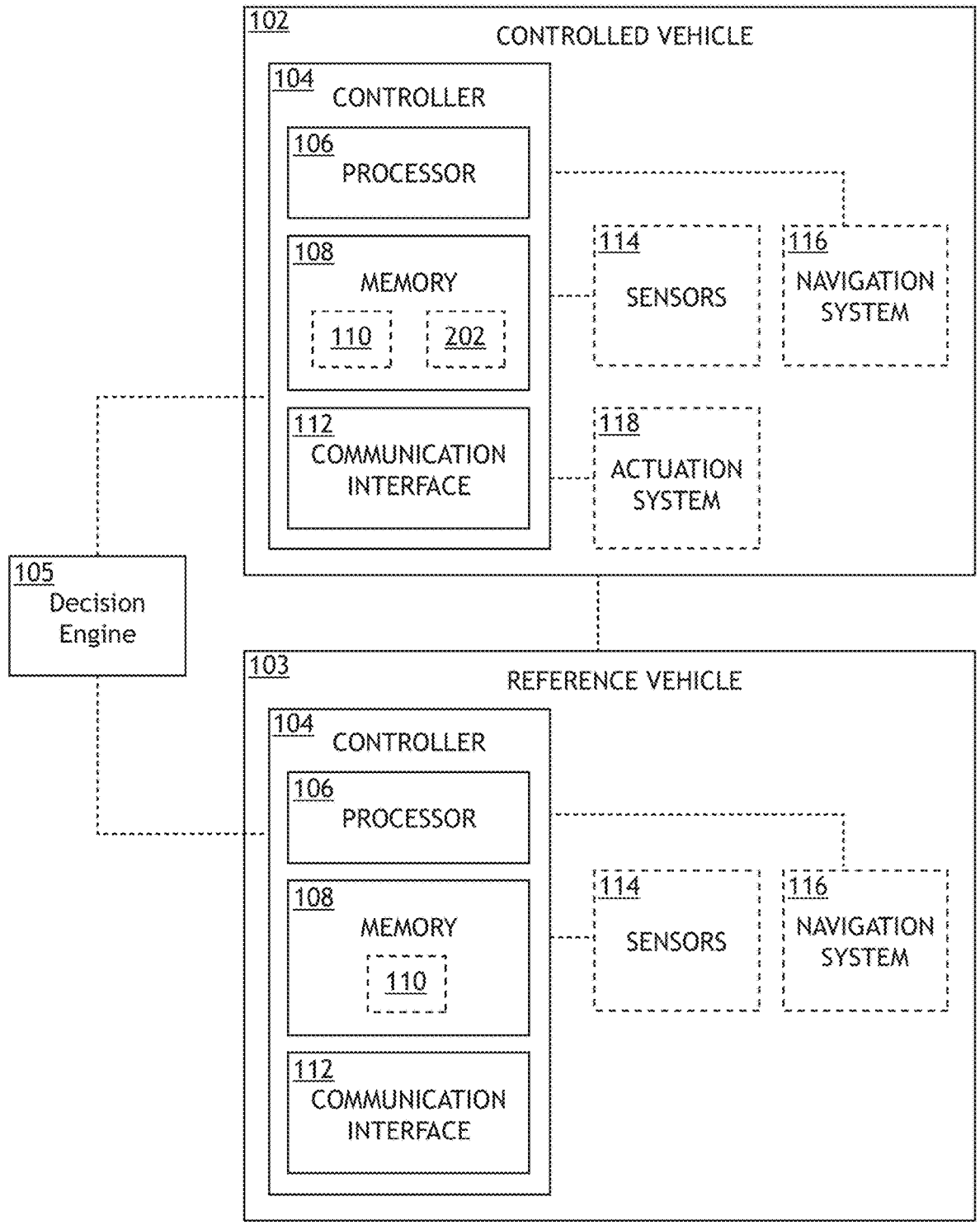
FIG. 1 illustrates a simplified block diagram of a system for providing maneuvering behaviors to a vehicle, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-11 generally illustrate a system and method for providing maneuvering behaviors to aerial vehicles using maneuver primitives, in accordance with one or more embodiments of the disclosure.

Relative maneuvering is a foundational skill in both autonomous aerial systems and manned aerial systems. Current flight control systems and integrated software solutions are well equipped with single aircraft path definition, guidance, and control functions. In commercial avionics, Flight Management Systems (FMS) provide path/route geometry definitions for the aircraft to follow and equipment like Flight Directors (FD) and Flight Control Computers (FCC) provide outer and inner loop aircraft control. The result is a solution that defines absolute path geometry and guidance functionality that allows the aircraft to follow a fixed path in three-dimensional (3D) space. Similar functionality exists for unmanned aerial systems (UAS), but the functionality may be hosted in a single monolithic flight control computer or another federated arrangement of line replaceable units (LRUs).

For relative maneuvering of multiple aircraft (e.g., aircraft maneuvering relative to one another), there is no longer an absolute Earth fixed path to define. Rather, any paths to follow would be dynamic and be relative from one aircraft to another. Similarly, any associated guidance and control functions related to path following would need to be modified or extended to operate in relative coordinates since the goal is now to have multiple aircraft maneuvering relative to one another. Existing systems attempts to solve this problem in a very limited setting, but are limited in their use of the vehicle's performance envelope. For example, C-130s are equipped with APN-243 Station Keeping Equipment to allow basic formation flight, however, this technology appears to be more than 30 years old and extremely limited. For instance, the existing system primarily supports straight and level flight and banking maneuvers of the lead aircraft may result in a loss of ability for follower aircraft to maintain station.

FIGS. 1-10 in general illustrate a system 100 for providing maneuvering behaviors to an aerial vehicle using maneuver primitives, in accordance with one or more embodiments of the disclosure.

FIG. 1—System Overview

FIG. 1 illustrates a simplified block diagram of the system 100, in accordance with one or more embodiments of the present disclosure.

The system 100 may include one or more controllers 104 communicatively coupled to one or more vehicles 102. For example, the one or more vehicles 102 may include one or more on-board controllers 104. For instance, the one or more vehicles 102 may include one or more on-board Flight Control System (FCS) controllers.

The one or more vehicles 102 may include at least one controlled vehicle 102. For example, the one or more vehicles 102 may include at least one controlled vehicle 102 configured to maneuver using one or more maneuver primitives 202 (stored in memory 108).

The one or more vehicles 102 may include any type of controlled vehicle known in the art including, but not limited to, one or more aerial vehicles, one or more ground vehicles, one or more space vehicles, one or more sea vehicles, one or more underwater vehicles, or the like. For example, the one or more vehicles 102 may include, but are not limited to, one or more missiles, one or more munitions, one or more ships, one or more cars, one or more submarines, one or more unmanned aerial vehicles, one or more unmanned underwater vehicles, one or more tanks, one or more trucks, one or more fixed-wing aerial vehicles, one or more rotary-wing aerial vehicles (e.g., helicopters), one or more multi-rotor aerial vehicles (e.g., quadcopters), and the like.

The system 100 may include one or more reference vehicles 103. In some embodiments, the one or more reference vehicles 103 may include one or more reference vehicles having their own trajectory. In this regard, the at least one controlled vehicle 102 may be configured to maneuver relative to the reference vehicles. In some embodiments, the at least one controlled vehicles 102 may utilize a reference trajectory directly specified in terms of its own geometry. The one or more reference vehicles 103 may include one or more controllers 104.

The one or more controllers 104 may include one or more processors 106 and memory 108. The memory 108 may store one or more sets of program instructions 110. The one or more processors 106 may be configured to execute the one or more sets of program instructions to carry out one or more various steps described throughout the disclosure.

The one or more controllers 104 may include one or more communication interfaces 112. For example, the one or more communication interfaces 112 may communicate via wired means or via wireless means (e.g., via Bluetooth, Wi-Fi, Near Field Communication (NFC), or the like), where the one or more communication interfaces may be configured to receive data, transmit data, transmit power, or otherwise interact with the other controllers or other components of the system (e.g., sensors, navigation systems, or the like).

The system 100 may further include one or more sensors 114. The one or more controllers 104 may be configured to communicatively couple to the one or more sensors 114, such that one or more sets of sensor data may be received by the one or more controllers 104. It is noted herein that although FIG. 1 depicts the one or more sensors 114 housed within/coupled to the one or more controlled vehicles 102, at least one of the one or more sensors 114 may be external to the one or more controlled vehicles 102. For example, the at least one of the one or more sensors 114 may be housed on a reference vehicle, such that sensor data may be received by the controlled vehicle 102 from a reference vehicle. The one or more sensors may include, but are not limited to, one or more LIDAR sensors, one or more radar sensors, one or more electro-optical/infrared (EO/IR) cameras, and the like.

The system 100 may further include a navigation system 116. The one or more controllers 104 may be configured to communicatively couple to the navigation system 116, such that one or more sets of navigation data may be received by the one or more controllers 104. It is noted herein that although FIG. 1 depicts the navigation system housed within/coupled to the one or more controlled vehicles 102, the navigation system 116 (or an additional navigation system) may be external to the one or more controlled vehicles 102. For example, the navigation system 116 (or an additional navigation system) may be housed on an additional vehicle (e.g., a reference vehicle), such that navigation data may be received by the controlled vehicle 102 from a reference vehicle. The one or more navigation systems 116 may include, but are not limited to, one or more global position systems (GPS), one or more inertial sensors (e.g., gyroscope sensors, accelerometer sensors, or the like), one or more integrated navigation processors, and the like.

The system 100 may further include an actuation system 118. The actuation system 118 may be configured to control one or more components (e.g., rudders, ailerons, elevators, throttles, or the like) of the controlled vehicle 102 using the one or more maneuver primitives 202. For example, the actuation system 118 may be configured to receive one or more processing control signals based on the generated one or more trajectory control signals (as discussed further herein), such that the actuation system 118 may be configured to control the one or more components of the controlled vehicle 102 to maneuver the controlled vehicle.

The one or more processors 106 may include any one or more processing elements known in the art. In this sense, the one or more processors 106 may include any microprocessor device configured to execute algorithms and/or program instructions. In general, the term "processor" may be broadly defined to encompass any device having one or more processing elements, which execute a set of program instructions from a non-transitory memory medium (e.g., the memory 108), where the one or more sets of program instructions are configured to cause the one or more processors 106 to carry out any of one or more process steps.

The memory 108 may include any storage medium known in the art suitable for storing the one or more sets of program instructions executable by the associated one or more processors 106. For example, the memory 108 may include a non-transitory memory medium. For instance, the memory 108 may include, but is not limited to, a read-only memory (ROM), a random access memory (RAM), a magnetic or optical memory device (e.g., disk), a magnetic tape, a solid state drive, and the like. The memory 108 may be configured to provide display information to a user device. In addition, the memory 108 may be configured to store user input information from one or more user input devices. The memory 108 may be housed in a common controller housing with the one or more processors 106. The memory 108 may, alternatively or in addition, be located remotely with respect to the spatial location of the processors 106 and/or the one or more controllers 104. For instance, the one or more processors 106, the one or more controllers 104 may access a remote database, accessible through a network (e.g., internet, intranet, and the like) via one or more communication interfaces.

The one or more communication interfaces 112 may be operatively configured to communicate with one or more components of the one or more controllers 104 and/or the one or more components of the system 100. For example, the one or more communication interfaces may also be coupled (e.g., physically, electrically, and/or communicatively) with the one or more processors 106 to facilitate data transfer between components of the one or more components of the one or more controllers 104 and/or the one or more components of the system 100 and the one or more processors 106. For instance, the one or more communication interfaces may be configured to retrieve data from the one or more processors 106, or other devices, transmit data for storage in the memory 108, retrieve data from storage in the memory 108, or the like.

Figure 2:
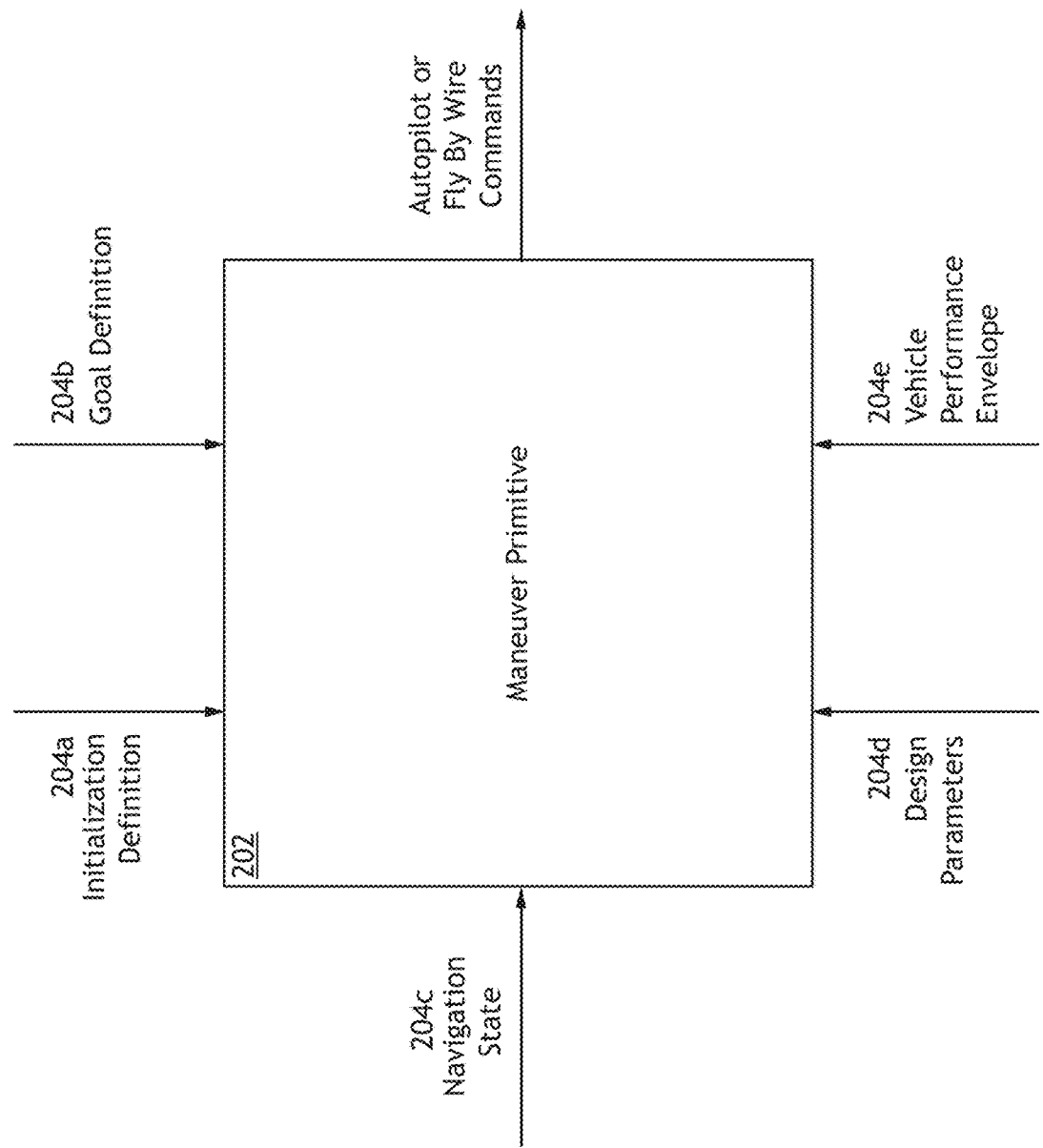
FIG. 2 illustrates a simplified block diagram of one or more maneuver primitives of the system, in accordance with one or more embodiments of the disclosure.

FIG. 2/3—Maneuver Primitive Overview

Figure 3:
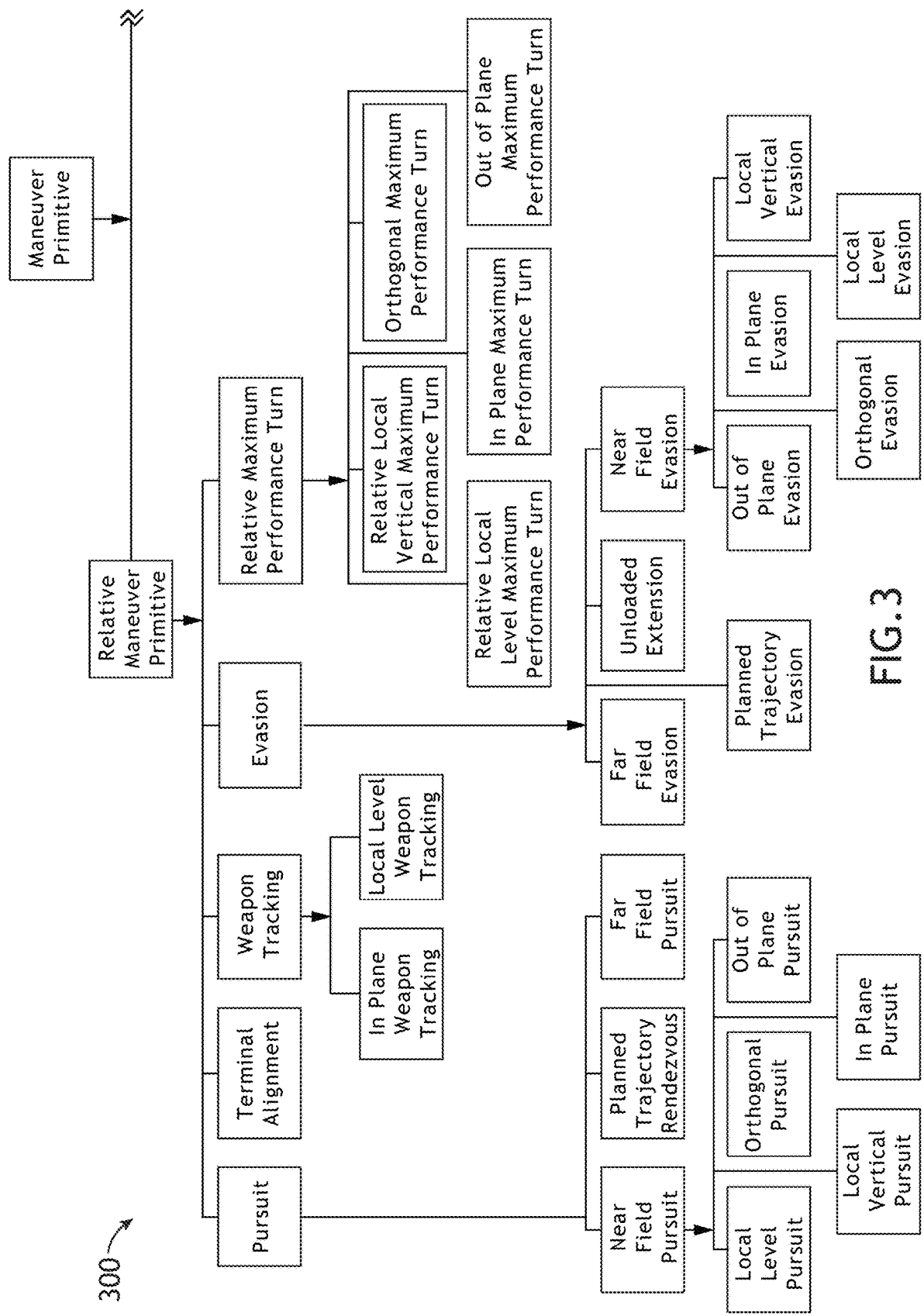
FIG. 3 illustrates a simplified flow chart depicting various example maneuver primitives of the system, in accordance with one or more embodiments of the present disclosure.
Figure 3:
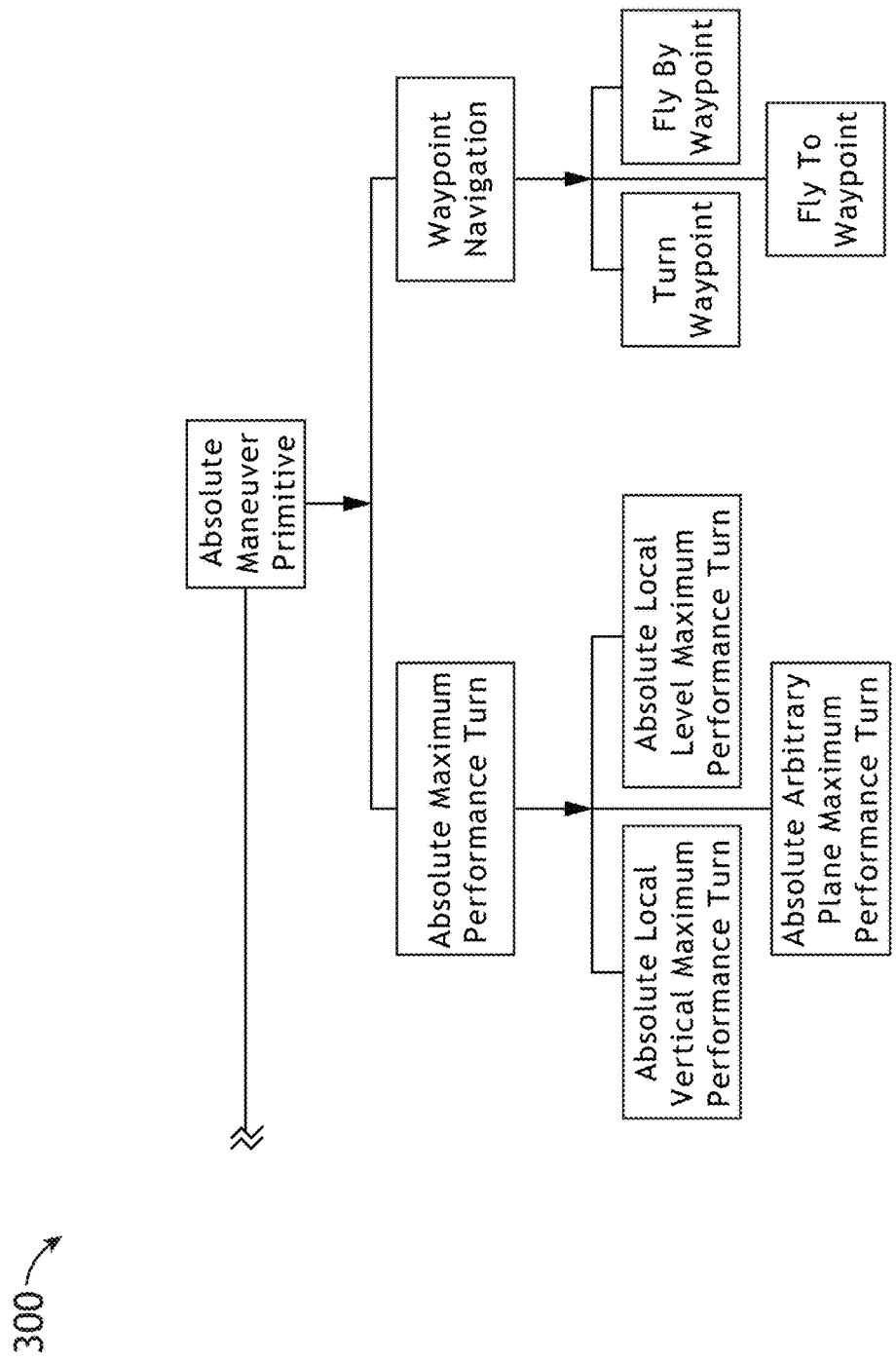

FIG. 2 illustrates a simplified block diagram of one or more maneuver primitives and the respective inputs of the system 100, in accordance with one or more embodiments of the disclosure. FIG. 3 illustrates a simplified flow chart depicting one or more example maneuver primitives 202 of the system, in accordance with one or more embodiments of the present disclosure.

One or more maneuver primitives 202 may be stored in memory 108 of the one or more controllers 104. For purposes of the present disclosure the term "maneuver primitives" and like terms, are defined as a software function that is used to influence the trajectory of a vehicle according to a maneuvering characteristic that is defined by the maneuver primitive type and its inputs.

Referring to FIG. 3, in some embodiments, the one or more maneuver primitives 202 may include one or more absolute maneuver primitives. The one or more absolute maneuver primitives may include any absolute maneuver primitive where a vehicle is maneuvered relative to a fixed reference frame such as, but not limited to, one or more earth fixed navigation frames (e.g., North-East Down (NED); East, North Up (ENU); Earth Centered, Earth Fixed (ECEF); wander azimuth; local grids; and the like), or the like. Therefore, the below examples are provided merely for illustrative purposes and shall not be construed as limiting the scope of the present disclosure.

For example, in a non-limiting example, the one or more absolute maneuver primitives may include fly to latitude/longitude waypoint (e.g., FROM, TO, NEXT waypoint specifications). For instance, the Fly to latitude/longitude waypoint absolute maneuver primitive may be configured to define a straight line leg to track. In this regard, the guidance logic (as discussed further herein) may be configured to drive bank angle from cross track error.

By way of another example, the one or more absolute maneuver primitives may include loiter. For instance, the Loiter absolute maneuver primitive may be configured to define a circle to track around a fixed latitude/longitude. In this regard, the guidance logic (as discussed further herein) may be configured to drive bank angle from radius/cross track error.

By way of another example, the one or more absolute maneuver primitives may include hover. For instance, the Hover absolute maneuver primitive may be configured to define a fixed latitude/longitude to hold position at. In this regard, the guidance logic (as discussed further herein) may be configured to drive velocity commands through positioning errors.

By way of another example, the one or more absolute maneuver primitives may include one or more absolute local level max performance turns configured to perform a maximum performance turn in the specified direction relative to the initial controlled vehicle's local level plane (e.g., a geometric plane containing the vehicle's position and aligned to be horizontal as defined at the vehicle's location).

By way of another example, the one or more absolute maneuver primitives may include one or more absolute arbitrary plane max performance turns configured to perform a maximum performance turn in the specified direction within a specified plane.

By way of another example, the one or more absolute maneuver primitives may include one or more absolute local vertical max performance turns configured to perform a maximum performance turn in the specified direction within a plane orthogonal to the initial local level plane of the controlled vehicle (e.g., a geometric plane containing the vehicle's position and aligned to be horizontal as defined at the vehicle's location).

Referring to FIG. 3, in some embodiments, the one or more maneuver primitives may include one or more relative maneuver primitives. The one or more maneuver primitives may include any relative maneuver primitive where a vehicle (e.g., a controlled vehicle) is maneuvered relative to another reference frame which has its own trajectory (e.g., a reference trajectory). Therefore, the below examples are provided merely for illustrative purposes and shall not be construed as limiting the scope of the present disclosure.

For example, the one or more relative maneuver primitives may include far field pursuit. The far field pursuit relative maneuver may include relative geometry and guidance to approach the reference trajectory when the controlled vehicle is at a long range to the reference trajectory and relative position data within the navigation state may have large errors due to sensor limitations. The goal definition 204*b* (as discussed further herein) provided to the far field pursuit relative maneuver primitive may be an angular offset of the line of sight vector from the controlled vehicle to the reference trajectory.

By way of another example, the one or more relative maneuver primitives may include planned trajectory rendezvous. The planned trajectory rendezvous relative maneuver primitive may include a relative geometry and guidance plan that executes an intercept trajectory to the reference trajectory when the controlled vehicle is at intermediate ranges to the reference trajectory. It is noted herein that the use of a trajectory plan that allows for an efficient rendezvous trajectory may be configured to minimize wasted energy.

By way of another example, the one or more relative maneuver primitives may include local level pursuit. The local level pursuit relative maneuver primitive may include a relative geometry and guidance place to pursue and track a position defined relative to a reference trajectory using motion restricted to the local level plane of the reference trajectory. The goal definition 204*b* (as discussed further herein) provided to the local level Pursuit relative maneuver primitive may be a position offset relative to the reference trajectory.

By way of another example, the one or more relative maneuver primitives may include in plane pursuit. The in plane pursuit relative maneuver primitive may include a relative geometry and guidance plan to pursue and track a position defined relative to a reference trajectory using motion restricted to the plane of motion of the reference trajectory. The goal definition 204*b* (as discussed further herein) provided to the in plane pursuit relative maneuver primitive may be a position offset relative to the reference trajectory.

By way of another example, the one or more relative maneuver primitives may include out of plane pursuit. The out of plane relative maneuver primitive may include a relative geometry and guidance plan to pursue and track a position defined relative to a reference trajectory without restriction to its plane of motion (e.g., a yo-yo in fighter aircraft maneuvering). The goal definition 204*b* (as discussed further herein) provided to the out of plane pursuit relative maneuver primitive may be a position offset relative to the reference trajectory.

By way of another example, the one or more relative maneuver primitives may include local vertical pursuit.

By way of another example, the one or more relative maneuver primitives may include orthogonal pursuit.

By way of another example, the one or more relative maneuver primitives may include far field evasion.

By way of another example, the one or more relative maneuver primitives may include unloaded extension.

By way of another example, the one or more relative maneuver primitives may include planned trajectory evasion.

By way of another example, the one or more relative maneuver primitives may include near field evasion (e.g., local level, local vertical, in plane, out of plane, orthogonal).

By way of another example, the one or more relative maneuver primitives may include relative local level max performance turn.

By way of another example, the one or more relative maneuver primitives may include relative local vertical max performance turn.

By way of another example, the one or more relative maneuver primitives may include in plane max performance turn.

By way of another example, the one or more relative maneuver primitives may include orthogonal max performance turn.

By way of another example, the one or more relative maneuver primitives may include out of plane max performance turn.

By way of another example, the one or more relative maneuver primitives may include terminal alignment.

By way of another example, the one or more relative maneuver primitives may include weapon tracking within one of several defined planes, which include local level and reference trajectory plane of motion.

The system 100 may be configured to initiate the one or more maneuver primitives 202 stored in memory 108 using a decision engine 105 communicatively coupled to the controller 104. The decision engine 105 may be configured to select at least one maneuver primitive 202 of the one or more maneuver primitives 202 for the controlled vehicle 102 to execute.

In some embodiments, the decision engine 105 may be an on-board decision engine 105. For example, the decision engine 105 may be housed on-board the controlled vehicle 102. In some embodiments, the decision engine 105 may be an off-board decision engine 105. For example, the decision engine 105 may be external (or off-board) to the controlled vehicle 102.

The decision engine may include, but is not required to include, a human operator, an artificial intelligence decision engine (e.g., a machine learning decision engine), a state machine, a scripted sequence of commands, or the like. For example, the machine learning decision engine may utilize machine learning technology such as, but not limited to, one or more neural networks, one or more Markov decision processes, or the like.

The system 100 may be configured to receive a plurality of inputs parameters 204 for the one or more maneuver primitives 202 upon initialization by the decision engine. For example, the one or more controllers 104 may be configured to continuously receive the plurality of input parameters 204 at one or more predetermined intervals of time based on the one or more maneuver primitives 202.

The plurality of input parameters may include one or more initialization definition input parameters 204a. The one or more initialization definition input parameters 204a may include data required to initialize the internal state of the maneuver primitive 202 to achieve expected behavior after instantiation. For example, the initialization definition data may include, but is not required to include, one or more filter states, one or more previous iteration outputs, and the like. In some embodiments, the initialization definition parameters 204a may be received from the decision engine 105. In some embodiments, the initialization definition parameters 204a may be received from the navigation system 116 or the one or more sensors 114. For example, the initialization definition data may include navigation data that is different than the navigation state data 204c.

The plurality of input parameters may include one or more goal definition input parameters 204b. The one or more goal definition input parameters 204b may include a quasi-static definition of the behavioral goal of the maneuver primitive 202 (e.g., specified relative geometry to a reference point or trajectory). For example, the goal definition may include, but is not required to include, three-dimensional (3D) position offset, angle off tail, and the like. In some embodiments, the goal definition input parameters 204b may be received from the decision engine 105.

The plurality of input parameters may include one or more navigation state input parameters 204c. The one or more navigation state input parameters 204c may include data defining the physical pose and trajectory of the controlled vehicle and that of any other vehicle or constructed trajectory necessary for operation of the maneuver primitive 202. The navigation state input parameters 204c may be received from the navigation system 116 and/or any additional navigation systems 114 within an additional vehicle. For example, the navigation state data may include, but is not required to include, position, velocity, acceleration, orientation, angular rates, line of sight, range, range rate, and the like. In some embodiments, the navigation state parameters 204c may be received from the navigation system 116 of the controlled vehicle 102. For example, the navigation system 116 of the controlled vehicle may provide navigation state parameters 204c related to the controlled vehicle state. In some embodiments, the navigation state parameters 204c may be received from the one or more sensors or the navigation system of the reference vehicle 103. For example, the navigation system or the sensors of the reference vehicle may provide navigation state parameters 204c related to the reference trajectory.

The plurality of input parameters may include one or more design input parameters 204d. The one or more design input parameters 204d may include data that specifies behavioral characteristics. For example, the design data may include, but is not required to include, data required to adapt a maneuver primitive 202 to a specific vehicle or a specific operational scenario, behavioral weighting parameters, limits, gains, configurable options, and the like. In some embodiments, the design input parameters 204d may be received from the decision engine 105. In some embodiments, the design input parameters 204d may be pre-configured.

The plurality of input parameters may include one or more vehicle performance envelope input parameters 204e. The one or more vehicle performance envelope input parameters 204e may include data defining the performance envelope of the vehicle, used by the maneuver primitive 202 to constrain maneuvering to remain within the envelope. The vehicle performance envelope input parameters 204e may be received from the one or more sensors 114 and/or any additional sensors within an additional vehicle. For example, the vehicle performance envelope data may include, but is not required to include, airspeed, altitude, load factor limits (e.g., sustained turn rate limits, specific power limits, or the like), and the like.

The contents of the plurality of inputs 204 may vary based on whether the maneuver primitive is a relative maneuver primitive or absolute maneuver primitive. For example, the contents of the navigation state input parameters 204c may vary based on whether the maneuver primitive is a relative maneuver primitive or absolute maneuver primitive. For instance, the contents of the navigation state input parameters 204c for a relative maneuver primitive may include data about a reference trajectory, while for an absolute maneuver primitive the data will not include data about a reference trajectory. By way of another example, the contents of the goal definition input parameters 204b may vary based on whether the maneuver primitive is a relative maneuver primitive or absolute maneuver primitive. For instance, the contents of the goal definition input parameters 204b for a relative maneuver primitive may include a goal definition telling the vehicle to go to a specified position relative to another vehicle, while for an absolute maneuver primitive the goal definition may be turn left (or right).

Further, the contents of the plurality of input parameters 204 may vary based on the specific relative and/or absolute maneuver primitive. For example, the contents of the plurality of input parameters 204 may vary based on the guidance logics encapsulated within the maneuver primitive, as discussed further herein.

It is noted herein that the one or more maneuver primitives 202 may be configured to accept a plurality inputs 204 to define their initialization. Further, it is noted herein that once the maneuver primitives are initiated and executed, the maneuver primitives may not terminate their own execution. The maneuver primitives do not interact with or modify the behavior of other maneuver types or instances. This ensures that a given maneuver primitive type will not be negatively impacted if the design of another maneuver primitive is modified, and places the authority for transition from one maneuver primitive to the next entirely at the system level above the maneuver primitives (e.g., at the decision engine level).

Figure 4A:
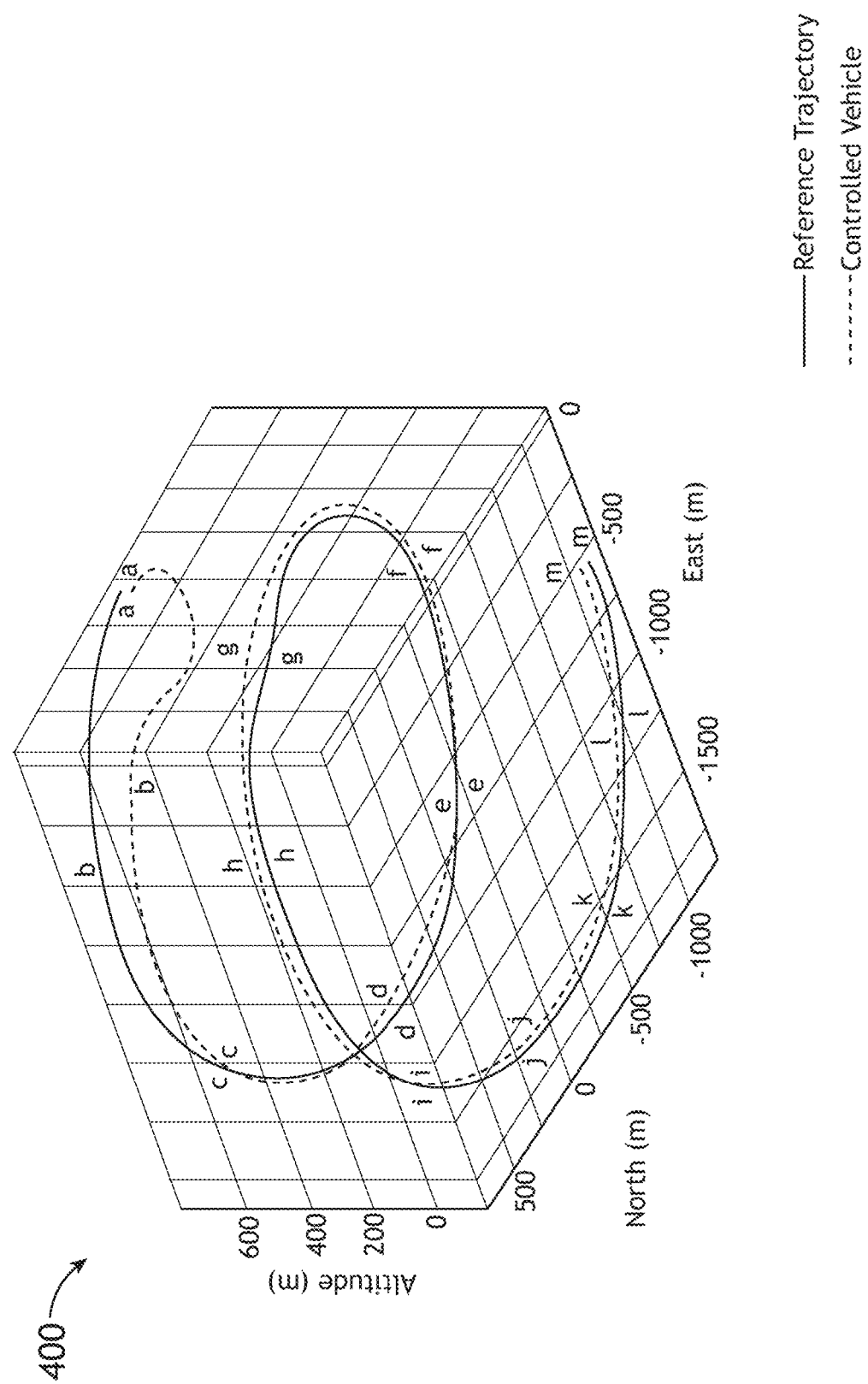
FIG. 4A illustrates a plot of an example trajectory of a vehicle generated through control of a vehicle using an example Relative Maneuver Primitive of the system, in accordance with one or more embodiments of the disclosure.

FIGS. 4A/4B—Example Trajectories

Figure 4B:
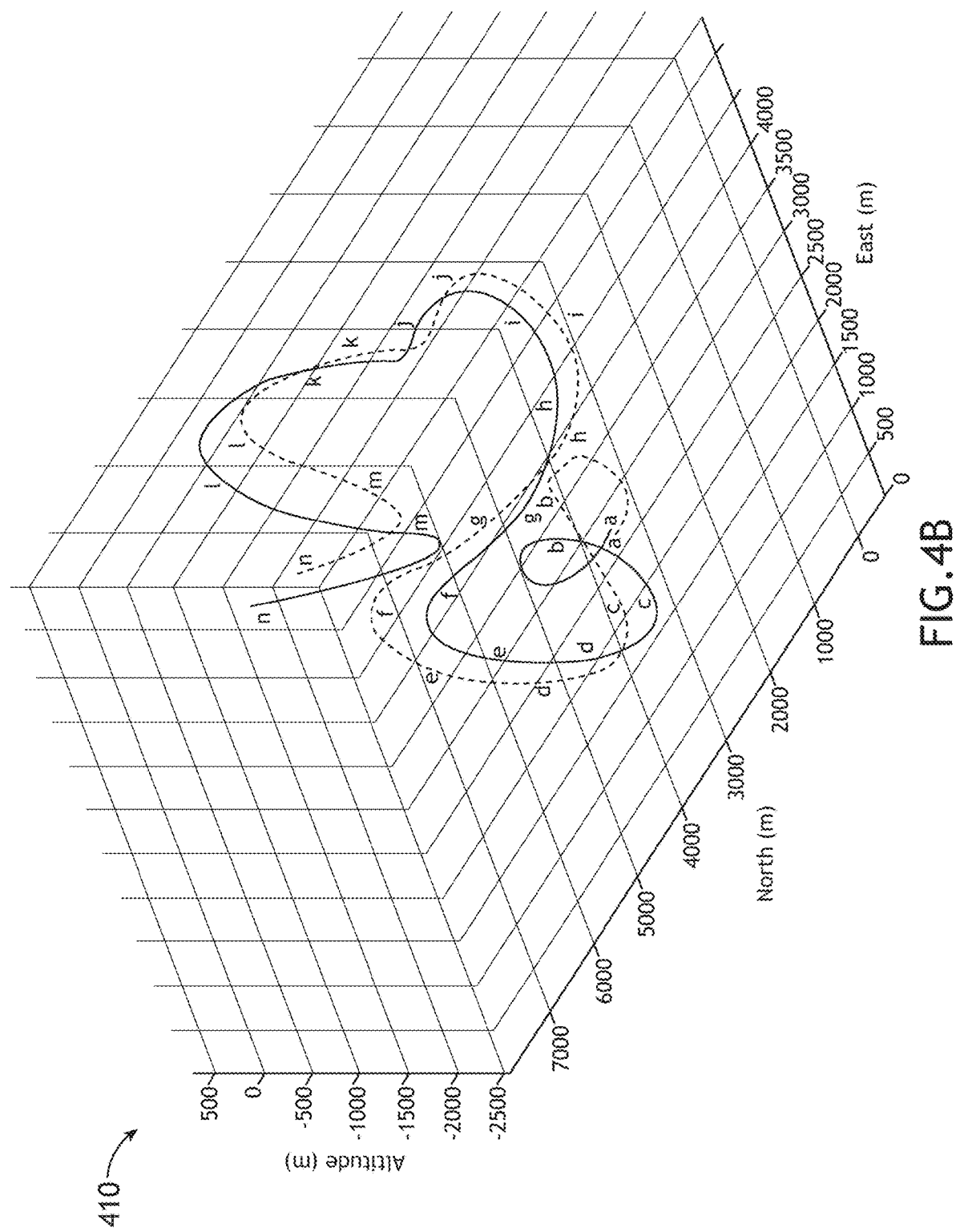
FIG. 4B illustrates a plot of an example trajectory of a vehicle generated through control of a vehicle using an example Relative Maneuver Primitive of the system, in accordance with one or more embodiments of the disclosure.

FIGS. 4A-4B illustrate plots of example trajectories of a vehicle generated through control of a vehicle using example relative maneuver primitives 202 of the system 100, in accordance with one or more embodiments of the disclosure. In particular, FIG. 4A illustrates a plot of an example trajectory 300 of a vehicle generated through a control of a vehicle using an example in plane pursuit relative maneuver primitive 204 of the system 100, in accordance with one or more embodiments of the disclosure. In particular, FIG. 4B illustrates a plot of an example trajectory 310 of a vehicle generated through a control of a vehicle using an example aggressive in plane pursuit relative maneuver primitive 204 of the system 100, in accordance with one or more embodiments of the disclosure.

The system 100 may be configured to generate one or more trajectory control signals at one or more predetermined intervals of time. For example, the one or more controllers 104 may be configured to continuously generate one or more control signals at one or more predetermined intervals of time based on the decision engine selection.

Although FIGS. 4A-4B illustrate a specific number of intervals of time (a-n) at specific predetermine time intervals, it is noted herein that the one or more controllers 104 may be configured to generate the one or more control signals at any predetermined interval of time. For example, the one or more trajectory control signals may be generated and provided to the vehicle twenty times a second. By way of another example, the one or more trajectory control signals may be generated and provided to the vehicle one-hundred times a second. By way of another example, the one or more trajectory control signals may be generated and provided to the vehicle once every minute. By way of another example, the one or more trajectory control signals may be generated and provided to the vehicle a thousand times per second.

In some embodiments, the one or more trajectory control signals may be updated asynchronously. In some embodiments, the one or more trajectory control signals may be updated in response to a decision engine action by the decision agent 105. In some embodiments, the one or more trajectory control signals may be updated in response to a controlled vehicle action by the controlled vehicle 102. In some embodiments, the one or more trajectory control signals may be updated in response to a triggering event (e.g., when a condition is detected internal the maneuver primitive). For example, the maneuver primitive may be steering a controlled vehicle to follow a path, and the one or more control signals may be configured to update at times when the vehicle is not following the path and the maneuver primitive's output needs to be updated (or changed).

The one or more trajectory control signals may be configured to maneuver the one or more vehicles based on the selected maneuver primitive. Referring to FIG. 4A, in a non-limiting example, the decision agent may select an in plane pursuit relative maneuver primitive 204 and the controller 104 may be configured to generate one or more in plane pursuit trajectory control signals to maneuver the vehicle 102 according to the in plane pursuit relative maneuver primitive 204. For instance, the controller 104 may be configured to maneuver the controlled vehicle 102 relative to the reference vehicle 103 when executing In Plane Pursuit. Referring to FIG. 4B, in an additional non-limiting example, the decision agent may select an aggressive in plane pursuit relative maneuver primitive 204 and the controller 104 may be configured to generate one or more aggressive in plane pursuit trajectory control signals to maneuver the vehicle according to the aggressive in plane pursuit relative maneuver primitive 204. For instance, the controller 104 may be configured to maneuver the controlled vehicle 102 relative to the reference vehicle 103 when executing aggressive in plane pursuit.

Figure 5:
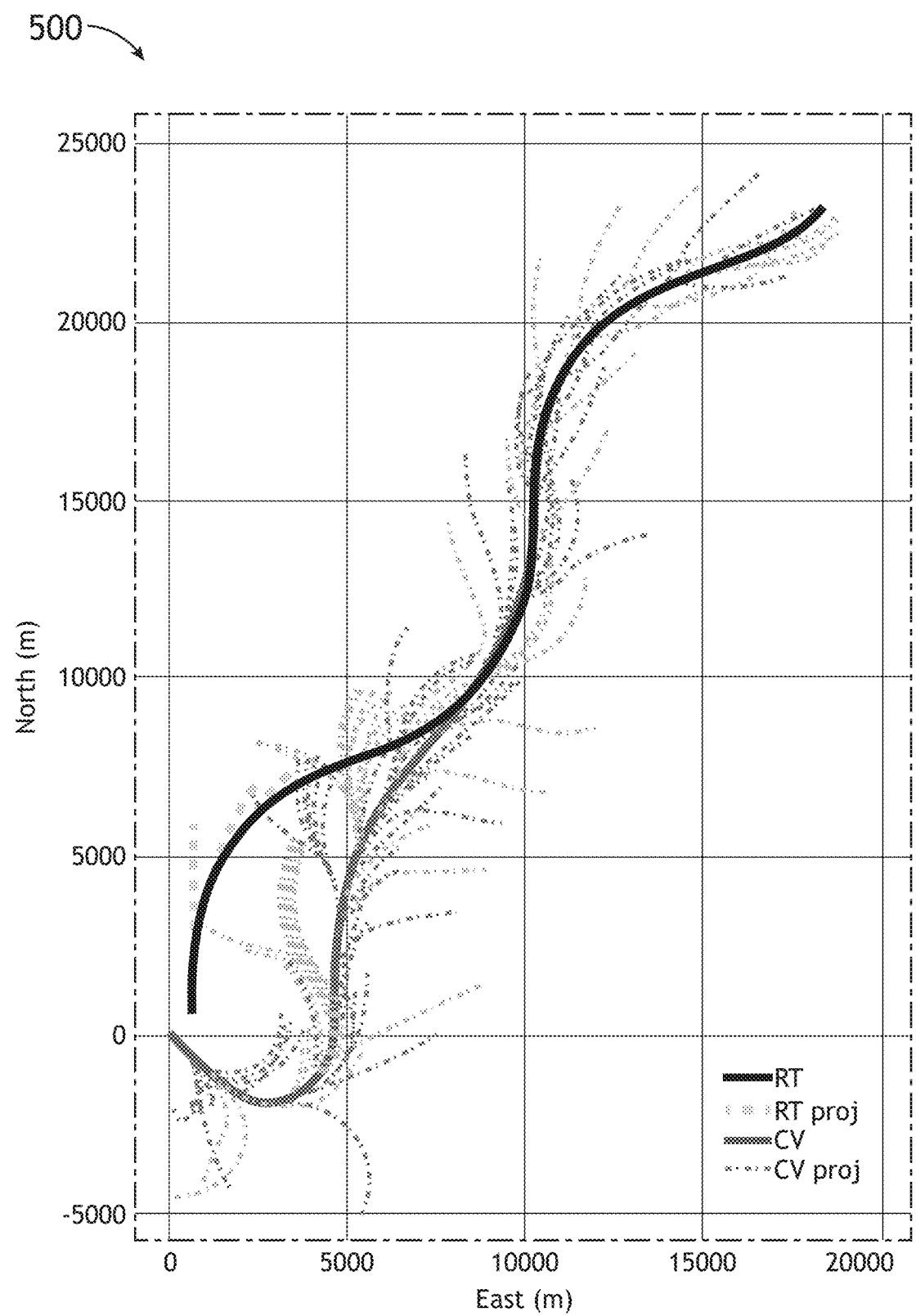
FIG. 5 illustrates a use of iterated forward simulation of vehicle trajectory using one or more example relative maneuver primitives of the system, in accordance with one or more embodiments of the disclosure.

FIG. 5—Iterated Forward Simulation

FIG. 5 illustrates a use of iterated forward simulation of vehicle trajectory 500 using one or more example relative maneuver primitives of the system, in accordance with one or more embodiments of the disclosure.

The decision engine 105 may be further configured to perform iterated forward simulation of the vehicle trajectory 500. For example, the decision engine 105 may be configured to project one or more reference trajectories (RTs). For each of the one or more RT forward trajectories (RT proj), the decision engine 105 may be configured to use each of the one or more maneuver primitives 202 (e.g., one or more relative maneuver primitives) to forward simulate the controlled vehicle to generate a CV trajectory. For instance, if there are m RT projections and n relative maneuver primitives, where m and n are integers, then there may be n×m CV projections (CV proj) generated by the decision engine 105. In this regard, the decision engine may be configured to observe the resultant trajectory and determine which maneuver primitive is most consistent with the decision engine's objectives and constraints. For instance, the decision engine may be configured to observe at least one of the reference trajectory projections (RT proj), controlled vehicle trajectory projections (CV proj), controlled vehicle trajectory (CV), or reference trajectory (RT) and determine which primitive is consistent with the decision engine's objectives and constraints. Then, the decision engine 105 may be configured to run the chosen relative maneuver primitive for the next predetermined time cycle.

Figure 6:
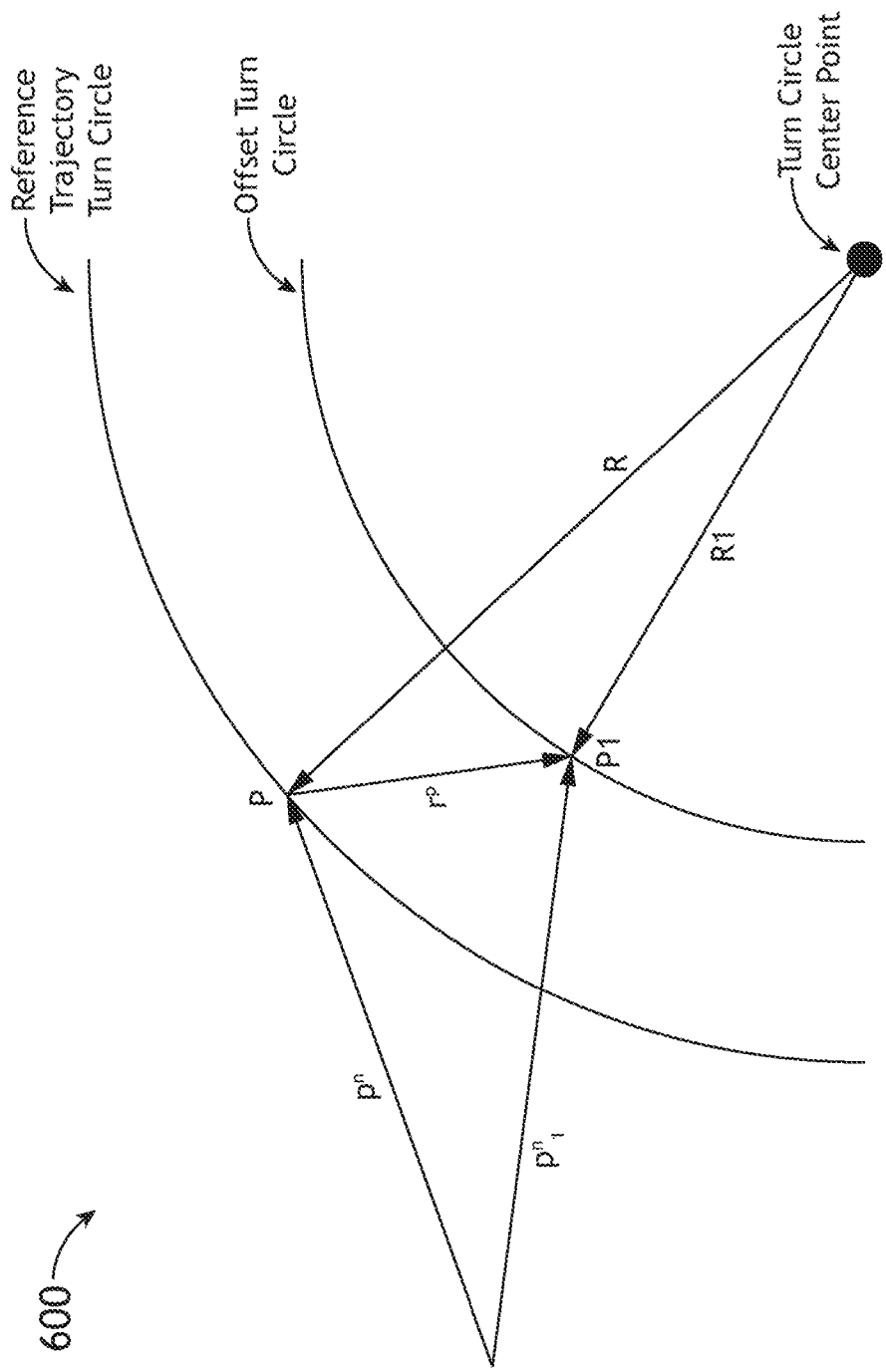
FIG. 6 illustrates a vector diagram of an offset of a turn circle of a reference trajectory within a two-dimensional plane, in accordance with one or more embodiments of the disclosure.

FIG. 6/7—Plane of Motion and Plane of Motion Offsets Overview

Figure 7:
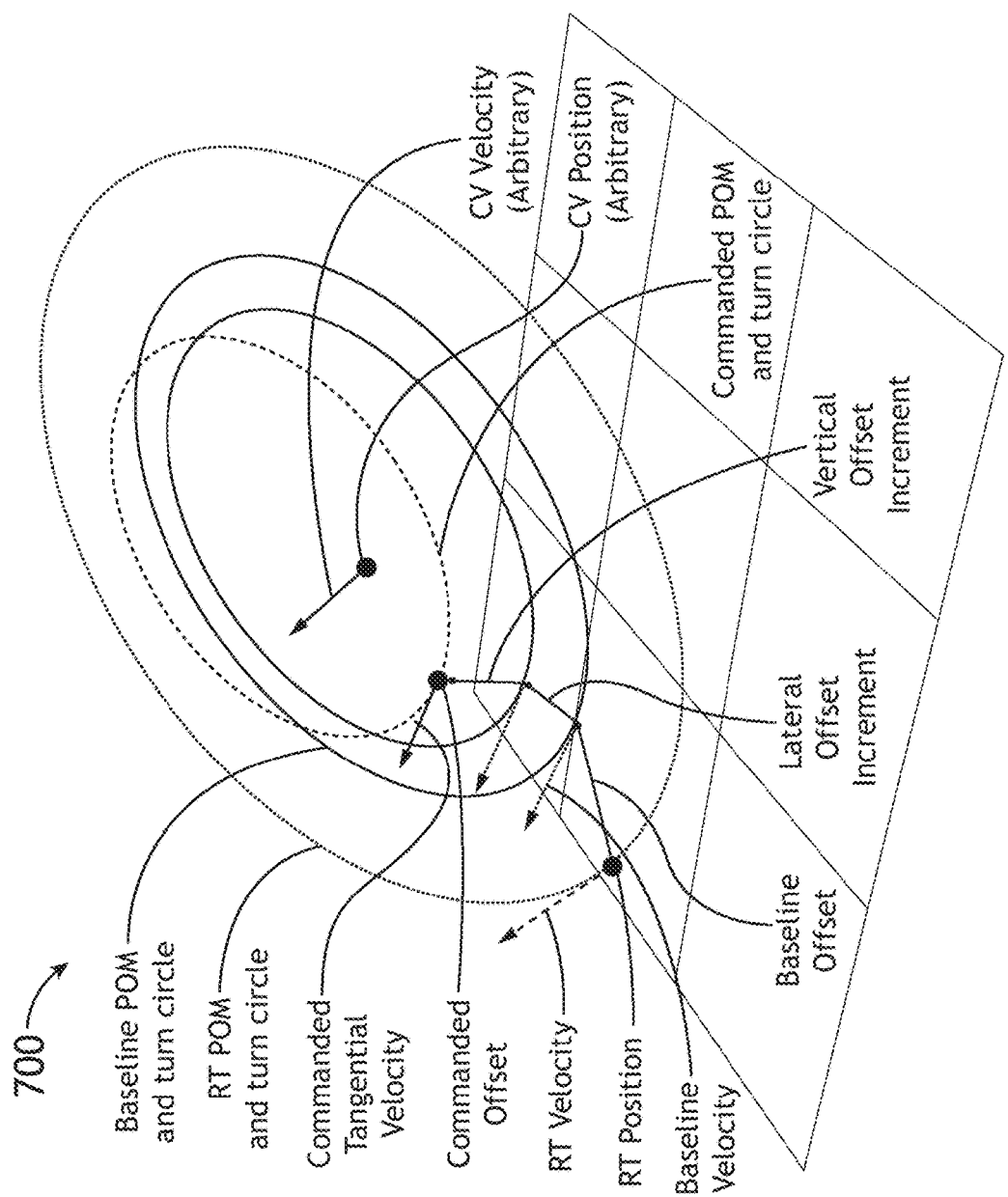
FIG. 7 illustrates a vector diagram of a plurality of plane of motion and turn circle offsets of a reference trajectory in three-dimensional space, in accordance with one or more embodiments of the disclosure.

FIG. 6 illustrates a vector diagram 600 of a turn circle offset of a reference trajectory within a specified two-dimensional plane, in accordance with one or more embodiments of the disclosure. FIG. 7 illustrates a vector diagram 700 of multiple plane of motion and turn circle offsets of a reference trajectory in three dimensions, in accordance with one or more embodiments of the disclosure. It is noted herein that although FIG. 6 is shown in a 2D plane, the plane of motion may be embedded in actual 3D space.

In some embodiments, the system 100 may be configured to determine a plane of motion and turn circle of a reference trajectory positioned relative to a reference vehicle of the one or more reference vehicles. For example, the one or more controllers 104 may be configured to determine a plane of motion and turn circle of a reference trajectory positioned relative to a reference vehicle of the one or more reference vehicles. For instance, the one or more controllers 104 may be configured to determine a plane of motion and turn circle of a reference trajectory at one or more predetermined time intervals. In this regard, the one or more controllers 104 may be configured to determine a plane of motion and turn circle of a reference trajectory incrementally in time as a maneuver primitive performs its guidance functions.

The plane of motion (POM) may be aligned with an axis system (X, Y, Z). For example, the X-axis may be aligned with velocity of the vehicle, XY plane containing the velocity and acceleration vectors of the vehicle, and Z-axis perpendicular to the XY plane. In this regard, the plane of motion of the reference trajectory may include, but is not limited to, a current velocity of the reference trajectory, a current position of the reference trajectory, a current acceleration of the reference trajectory, and the like. The velocity, position, and acceleration of the reference trajectory (also referred to as the trajectory of the reference vehicle 103) may be received from one or more sensors or the like from the reference vehicle.

In some embodiments, the system 100 may be further configured to filter the plane of motion of the reference trajectory using a filtering model configured to eliminate unnecessary rotation of the plane of motion. For example, the one or more controllers 104 may be configured to filter the plane of motion of the vehicle using the filtering method. The filtering method may be configured to produce at its output a filtered plane of motion that is loosely coupled to the instantaneous plane of motion of the reference trajectory. In this regard, the filtering model may be configured to use a rotation minimizing frame that is irrotational about the velocity vector of the reference trajectory.

Referring to FIG. 6, the system 100 may further be configured to determine one or more offset turn circles within a specified plane. For example, the one or more controllers 104 may be configured to determine one or more offset turn circles. In one instance, the one or more controllers 104 may be configured to generate one or more offset turn circles including an offset to a specified position ($r^p$) relative to the reference trajectory. In some embodiments, the offset turn circle may be calculated within the RT POM. In some embodiments, the offset turn circle may be calculated within the filtered RT POM. Further, the offset turn circle may be calculated within at least one of the local level plane, local vertical plane, a plane orthogonal to the RT POM, or the like.

In vector diagram 600, $R_1$ is the offset turn radius; R is the reference trajectory (RT) turn radius; P1 is the offset position, $r^p$ is the relative position offset vector; P is the RT position, $P''$ is the reference trajectory position vector in an absolute frame; and $P''_1$ is the offset position vector in an absolute frame.

It is noted herein that the determined offset plane of motion and turn circle are defined at some arbitrary 3D offset from the baseline plane of motion and turn circle and are kinematically consistent with it. For example, if the position offset is inside the reference trajectory turn circle, the turn circle offset operation determines a decreased velocity so that the controlled vehicle following the offset turn circle maneuvers at the same angular rate around a turn as the original reference trajectory. Similarly, if the position offset is outside of the reference trajectory turn circle, an increased velocity is calculated. Similar adjustments are made for all dynamic states and are done in real time such that the baseline turn circle can represent any arbitrary reference trajectory and the offset turn circle can represent any trajectory offset relative to the baseline reference trajectory.

Referring to FIG. 7, the system 100 may perform a sequence of offset operations relative to the plane of motion (POM) and turn circle of the reference trajectory. These operations may be offset relative to a POM and turn circle that was determined by an offset to a previous POM and turn circle. For example, the reference trajectory POM and turn circle may be offset by the baseline offset to produce the baseline POM and turn circle (POMTC0). For example, the baseline POM and turn circle (POMTC0) may be offset by the lateral offset to produce another POM and turn circle (POMTC1). For example, the previous POM and turn circle (POMTC1) may be offset by the vertical offset to produce another POM and turn circle (POMTC2). This revision of the POM and turn circle (POMTC2) may be then used by a 3D non-linear guidance logic.

It is noted herein that the system 100 may be configured to determine the plane of motion and planes of motion offsets for some of the previously mentioned examples including, but not limited to, in plane pursuit, out of plane pursuit, in plane evasion, out of plane evasion, in plane max performance turn, out of plane max performance turn, in plane weapons, and the like.

Figure 8:
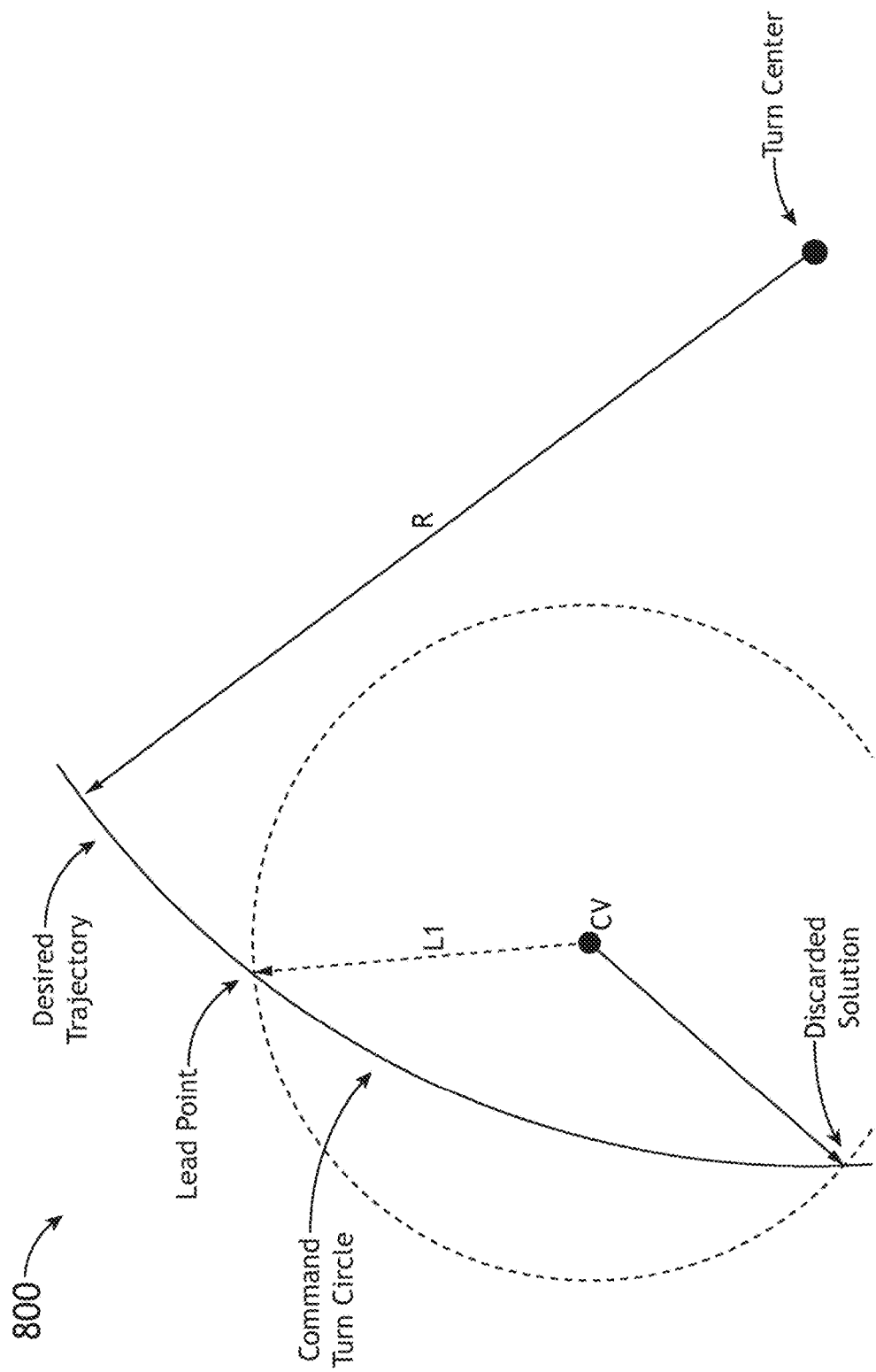
FIG. 8 illustrates a vector diagram of a two-dimensional non-linear guidance logic within the commanded plane of motion.

FIG. 8—Guidance Law Background

FIG. 8 illustrates a vector diagram of a two-dimensional non-linear guidance logic 800. Guidance laws may be used to follow the path prescribed by the one or more maneuver primitives. In conventional flight control systems, guidance laws exist but are rather simplified. For example, conventional guidance laws tend to follow either straight lines or arcs only. In the case of relative maneuvering, path geometries can effectively be arbitrary in space and therefore are much more complicated to track.

Referring to FIG. 8, a conventional guidance law used in conventional flight control systems includes a two-dimensional non-linear guidance law that effectively looks ahead for a lead point on the trajectory and establishes a bank angle command to steer toward that lead point. To do so, the conventional guidance law looks at a distance L1 away from the ownship (e.g., controlled vehicle) in any direction and determines where a path intersection occurs, and if multiple intersections occur, one point is selected as the lead point. The conventional guidance law then commands a bank angle towards the path based on the location of this lead point.

It is noted herein that the conventional 2D non-linear guidance law utilized by conventional flight control systems has a number of disadvantages. For example, the guidance law does not consider how to respond if the desired path is completely outside (or completely inside) of the circle defined by the lead distance (L1). Further, the 2D non-linear guidance law uses a fixed tuning for L1, which does not guarantee stability under all operating conditions. Additionally, the conventional 2D non-linear guidance law only considers 2D position of the aircraft relative to the desired trajectory. Finally, the conventional 2D non-linear guidance law does not consider a method to anticipate the trajectory of the desired trajectory beyond its defined limits. Therefore there is a need for a more generic guidance logic that is equipped to handle the full needs of the relative maneuvering problem.

Figure 9:
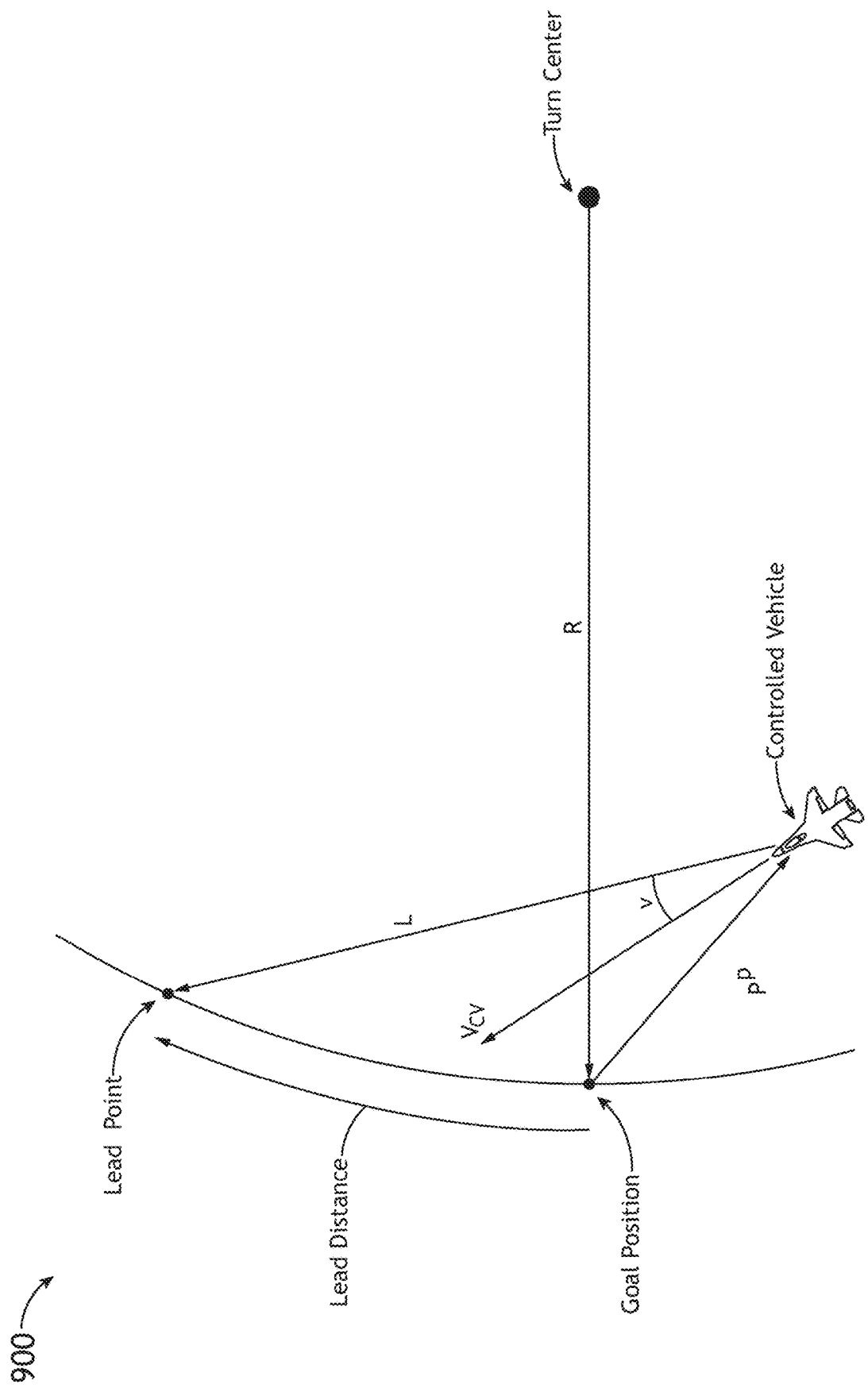
FIG. 9 illustrates a vector diagram of a three-dimensional non-linear guidance logic used to guide a vehicle of the system, in accordance with one or more embodiments of the disclosure.

FIG. 9—3D Non-Linear Guidance Logic

FIG. 9 illustrates a vector diagram of a three-dimensional non-linear guidance logic 900 used to guide a vehicle of the system, in accordance with one or more embodiments of the disclosure.

The system 100 may be configured to guide the controlled vehicle based on the generated one or more trajectory control signals using a three-dimensional (3D) non-linear guidance logic. For example, the one or more controllers 104 may be configured to generate one or more steering commands and provide the one or more steering commands to an autopilot sub-system. The autopilot sub-system may be configured to guide the vehicle based on the generated one or more steering commands and the one or more trajectory control signals.

The 3D non-linear guidance logic may be configured to handle the outside and inside L1 cases in a meaningful way which makes the guidance logic usable in any relative geometry case. Further, the 3D non-linear guidance logic may be defined using parameters that can be turned to ensure stability throughout the entire operation, such that the guidance law is not defined by a fixed L1 distance. For example, the guidance logic may be defined using parameters for the desired closed loop tracking dynamics such as, but not limited to, natural frequency (wn), damping ratio (zeta), or the like. These parameters are used to determine the lead distance L1 used. Further, the guidance logic may be three-dimensional guidance logic, rather than a two-dimensional law, such that the guidance logic may be applicable to the full 3D geometry and not simply 2D. The guidance law may be made to operate in 3D by referencing a 2D lead calculation to the reference trajectory's plane of motion and turn circle. The guidance law may also be made to operate in 3D by calculating lead distance and steering commands in 3D rather than in a 2D plane.

Referring to FIG. 9, in the vector diagram 900, $R^p$ is the controlled vehicle position relative to a goal position; the airplane depicts the controlled vehicle; v is the turn angle, $V_{CV}$ is the controlled vehicle (CV) velocity vector; R is the turn radius; and L is the 3D lead distance.

Figure 10:
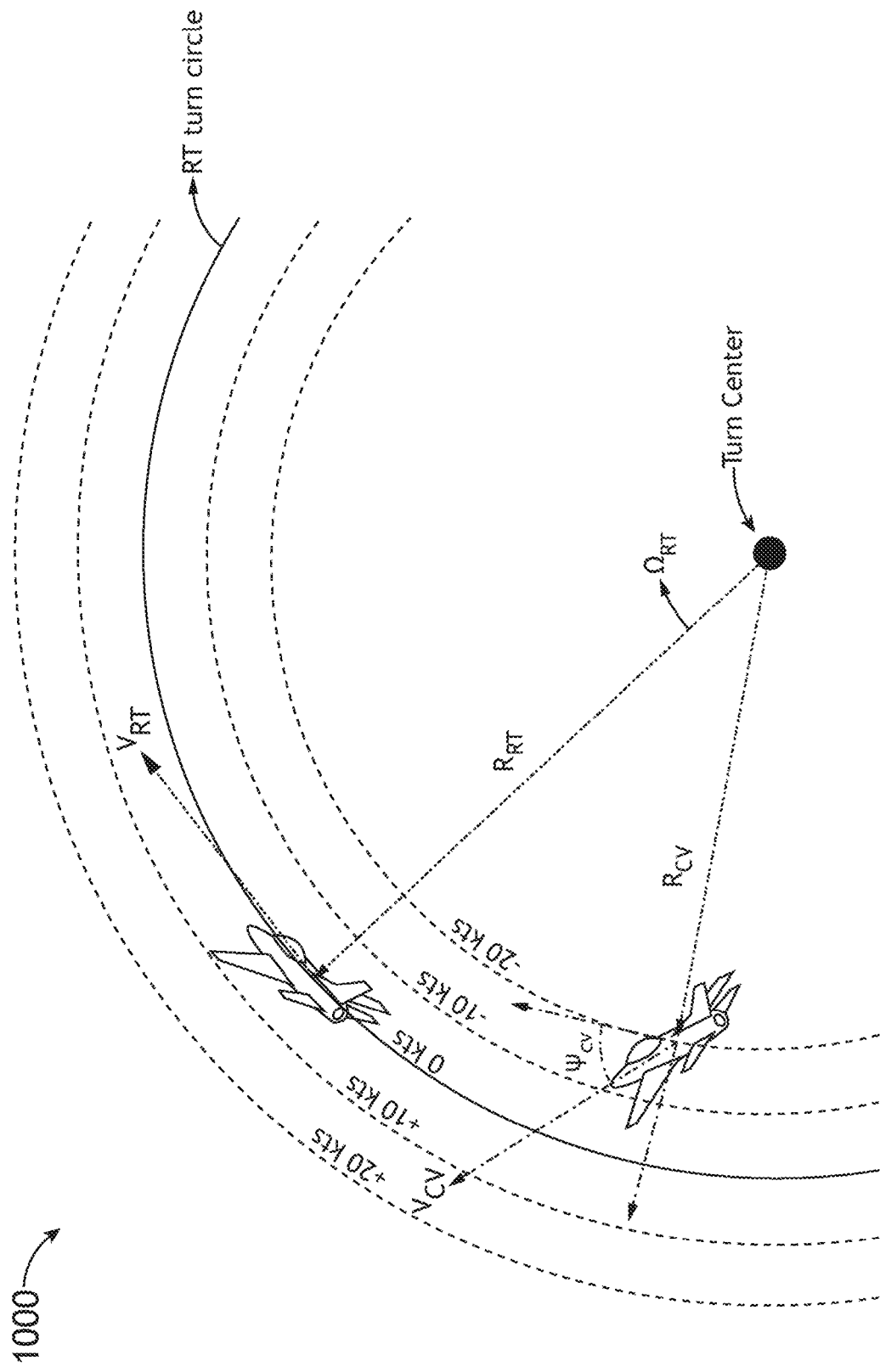
FIG. 10 illustrates a vector diagram of an axial guidance logic 1000 used to guide a vehicle of the system, in accordance with one or more embodiments of the disclosure.

FIG. 10—Axial Control Guidance Logic Overview

FIG. 10 illustrates a vector diagram of an axial guidance logic 1000 used to guide a vehicle of the system 100, in accordance with one or more embodiments of the disclosure.

In some embodiments, the system 100 may be configured to guide the vehicle using an axial guidance logic. For example, the one or more controllers may be configured to guide the vehicle using an axial guidance logic. It is noted herein that the system 100 may be configured to utilize the axial guidance logic for some of the previously mentioned examples including, but not limited to, local level pursuit, in plane pursuit, out of plane pursuit, or the like.

The guidance logic previously discussed herein may be configured to provide path following behavior that allows for generic relative maneuvering in the lateral and vertical senses, however, an axial (or longitudinal) guidance logic is needed to ensure appropriate tracking of intended position forward and aft along the desired trajectory (rather than lateral or vertical). Conventional axial guidance laws in conventional flight control systems perform axial adjustments based on straight lines. However, a change in airspeed based on straight line distance between a lead and follower aircraft would be ineffective for dynamic relative maneuvering scenarios.

The axial guidance logic of the present disclosure may be configured to perform axial adjustments to the speed travelled along the path based on at least one of commanded airspeed, a lateral offset of the commanded plane of motion, or a vertical offset of the commanded plane of motion, with the axial guidance logic configured to allocate these increments in an optimal fashion at each instant in time.

In vector diagram 1000, $\Omega_{RT}$ is the reference trajectory (RT) turn rate; $R_{CV}$ is the controlled vehicle (CV) radius; $R_{RT}$ is the RT radius; $\Psi_{CV}$ is the controlled vehicle track angle with respect to the turn circle; $V_{CV}$ is the CV velocity vector; and $V_{RT}$ is the RT velocity vector. The speed increments shown in FIG. 10 (e.g., −20 kts, −10 kts, 0 kts, +10 kts, +20 kts) are provided merely for illustrative purposes and shall not be construed as limiting the scope of the present disclosure. The speed increments (e.g., −20 kts, −10 kts, 0 kts, +10 kts, +20 kts) are configured to provide one or more increments of relative maneuvering advantage. For example, the increment −10 kts gives −10 kts of relative maneuvering advantage.

It is noted herein that FIG. 10 is a representation of the relationship between a lateral offset relative to the baseline turn circle and the circumferential overtake rate relative to the goal position. Controlled vehicle positions offset to the inside of the turn circle produce an effect on the rate at which the controlled vehicle overtakes the goal position that is analogous to increased speed of the controlled vehicle. In one non-limiting definition of an axial guidance method, the similarity of effect on overtake rate between lateral position and speed may be used in the calculation of the outputs of the speed command given to the controlled vehicle and the commanded lateral offset relative to the baseline plane of motion and turn circle.

The height and climb rate of the controlled vehicle relative to the goal position has a somewhat similar effect on overtake rate. In another non-limiting definition of an axial guidance method, the controlled vehicle's speed command is determined in coordination with a commanded vertical offset relative to the baseline plane of motion and turn circle.

Figure 11:
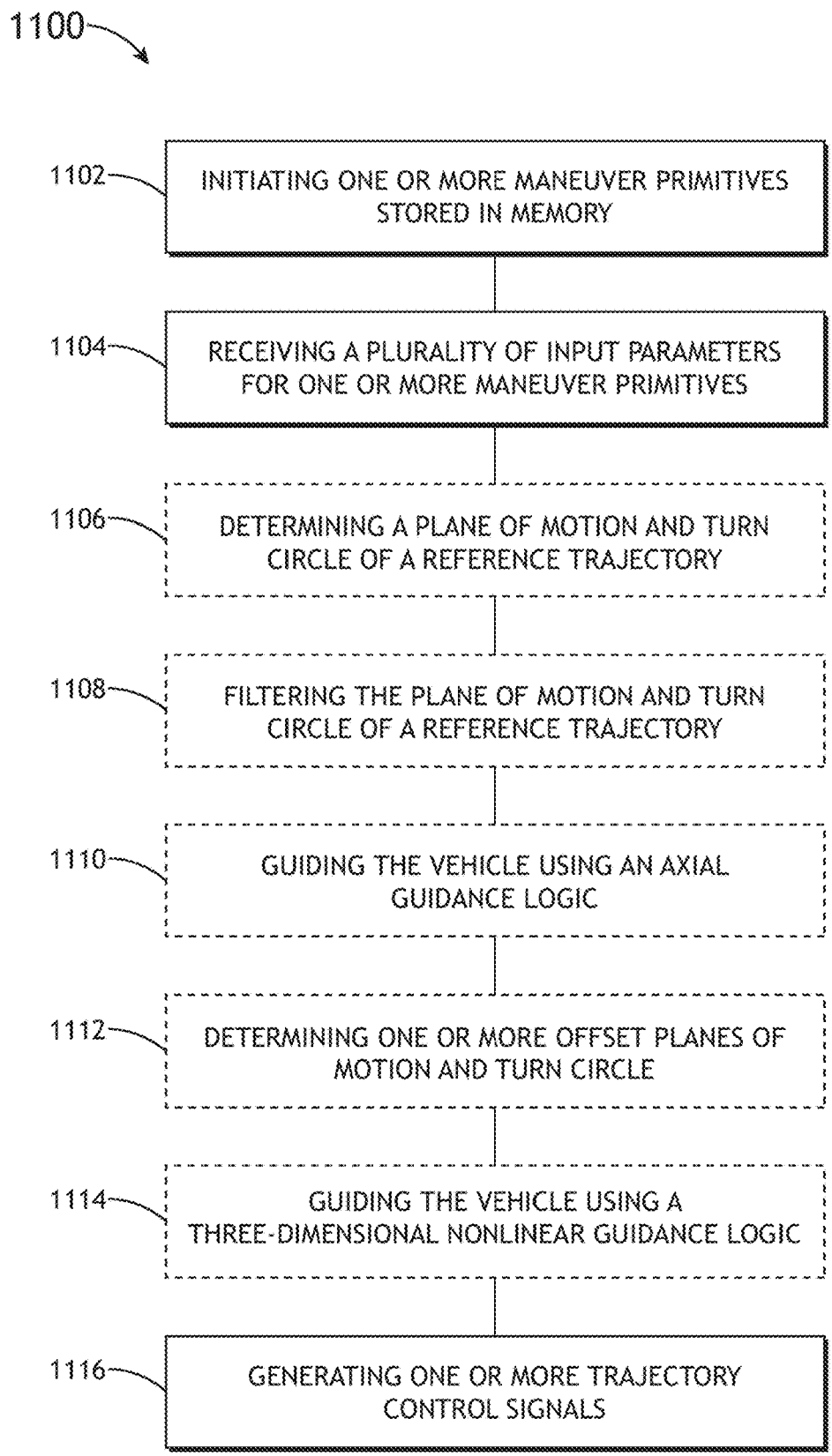
FIG. 11 illustrates a flow diagram depicting a method or process for the system, in accordance with one or more embodiments of the disclosure.

FIG. 11—Method Overview

FIG. 11 illustrates a flowchart depicting a method or process 1100 for providing maneuvering behaviors to vehicles using maneuvering behaviors, in accordance with one or more embodiments of the present disclosure.

In step 1102, one or more maneuver primitives may be initiated in response to a decision engine selection. For example, one or more maneuver primitives stored in memory 108 of the one or more controllers 104 may be initiated in response to a decision engine selection. The decision engine may be configured to select a maneuver primitive of the one or more maneuver primitives for one or more controlled vehicles to execute.

In step 1104, a plurality of input parameters may be configured to be received for the one or more maneuver primitives. For example, the one or more controllers 104 may be configured to receive a plurality of input parameters 204 for the one or more maneuver primitives 202. It is noted herein that the one or more controllers 104 may be configured to receive the plurality of input parameters 204 at one or more pre-determined intervals of time, such that a continuous flow of input data is received by the controlled vehicle 102.

The plurality of input parameters may include, but are not limited to, one or more initialization definition input parameters, one or more goal definition input parameters, one or more navigation state input parameters, one or more design input parameters, one or more vehicle performance envelope input parameters, and the like.

In optional step 1106, a plane of motion and turn circle of a reference trajectory positioned relative to a reference vehicle of the one or more reference vehicles may be determined. The plane of motion of each reference trajectory of the one or more reference trajectories may include a current position of the reference trajectory. The plane of motion may be aligned to the orientation of a current velocity of the reference trajectory. The plane of motion may be aligned to the orientation of a current acceleration of the reference trajectory.

The turn circle of each reference trajectory of the one or more reference trajectories may be embedded within the plane of motion of the one or more reference trajectories. The turn circle of each reference trajectory of the one or more reference trajectories may be aligned with the current position of the reference trajectory. The turn circle of each reference trajectory of the one or more reference trajectories may be tangential to the current velocity of the reference trajectory. The turn circle of each reference trajectory of the one or more reference trajectories may be aligned with curvature matching the reference trajectory.

In optional step 1108, the plane of motion of each reference trajectory of the one or more reference trajectories may be filtered. For example, the plane of motion of each reference trajectory may be filtered using a filtering model configured to eliminate unnecessary rotation of the plane of motion.

In optional step 1110, the vehicle may be configured to be guided using an axial guidance logic. The axial guidance logic may be configured to influence the position of the vehicle in a forward to aft dimension relative to the one or more reference trajectories. The axial guidance logic may be configured to use at least one of a commanded speed, a guidance offset perpendicular to the velocity of the one or more reference trajectories within the plane of motion, a guidance offset perpendicular to the velocity of the one or more reference trajectories and perpendicular to the plane of motion, or a guidance offset perpendicular to the velocity of the one or more reference trajectories and perpendicular to the plane of motion.

In an optional step 1112, one or more offset plane of motions and turn circles may be determined. The one or more offset planes of motion and turn circles may include an offset to a goal position. The one or more offset planes of motion and turn circles may include an offset to a guidance offset determined by the one or more controllers. The one or more offset planes of motion and turn circles may further include an offset to the controlled vehicle.

In optional step 1114, the vehicle may be configured to be guided using a three-dimensional non-linear guidance logic. The three-dimensional non-linear guidance logic may be configured to operate in three dimensions of position. The three dimensional non-linear guidance logic may be configured to utilize all possible position values of at least one of the vehicle or the one or more reference trajectories. The three-dimensional non-linear guidance logic may be configured to use the one or more offset planes of motion and turn circles (determined in step 1114).

In step 1116, one or more trajectory control signals may be generated at one or more predetermined time intervals. The one or more trajectory control signals may be configured to maneuver the one or more controlled vehicles based on the decision engine selection. For example, the one or more trajectory control signals may include one or more autopilot commands to maneuver the controlled vehicle based on the selected maneuver primitive. By way of another example, the one or more control signals may include one or more fly by wire commands to maneuver the controlled vehicle based on the selected maneuver primitive.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, the system comprising:

one or more controllers communicatively coupled to one or more vehicles, the one or more vehicles including at least one controlled vehicle and one or more reference vehicles, wherein the one or more reference vehicles are associated with one or more reference frames, wherein the one or more reference frames have their own reference trajectories, wherein the at least one controlled vehicle is configured to dynamically maneuver relative to the one or more reference frames using one or more relative maneuver primitives, wherein the one or more relative maneuver primitives are directed towards a plurality of maneuvering behaviors associated with maneuvering the at least one controlled vehicle, the one or more controllers including one or more processors configured to execute one or more program instructions causing the one or more processors to: initiate the one or more relative maneuver primitives stored in memory in response to a selection by a decision engine, the decision engine configured to select a maneuver primitive of the one or more relative maneuver primitives for the at least controlled vehicle of the one or more vehicles to execute, the one or more relative maneuver primitives configured as a software function used to influence a trajectory of the at least one controlled vehicle of the one or more vehicles according to a maneuvering characteristic defined by a type of the one or more relative maneuver primitives and a plurality of input parameters;

continuously receive the plurality of input parameters for the one or more relative maneuver primitives at one or more predetermined intervals of time during the execution of the selected relative maneuver primitive of the at least one controlled vehicle, the plurality of input parameters including one or more initialization definition input parameters, one or more goal definition input parameters, one or more navigation state input parameters, one or more design input parameters, and one or more vehicle performance envelope input parameters, the one or more design input parameters including preconfigured behavioral characteristic data required to adapt the selected relative maneuver primitive to the at least one controlled vehicle and a predetermined operational scenario, the one or more vehicle performance envelope input parameters including performance data defining a performance envelope of the one or more vehicles to constrain maneuvering of the at least one controlled vehicle of the one or more vehicles within the performance envelope of the one or more vehicles, the one or more initialization definition input parameters including initialization data required to initialize an internal state of the one or more relative maneuver primitives to achieve an expected behavior after instantiation by the decision engine, the one or more goal definition input parameters including a quasi-static definition of the expected behavioral of the one or more relative maneuver primitives, the quasi-static definition include a specified relative geometry to one of a reference point or a trajectory; and generate one or more trajectory control signals at one or more predetermined intervals of time, the one or more trajectory control signals configured to dynamically maneuver the at least one controlled vehicle of the one or more vehicles relative to the one or more reference vehicles based on the decision engine selection and the plurality of received input parameters.

2. The system of claim 1, wherein the one or more relative maneuver primitives include at least one of:
far field pursuit, planned trajectory rendezvous, local level pursuit, in plane pursuit, or out of plane pursuit.

3. The system of claim 1, wherein the one or more controllers are further configured to:
determine a plane of motion and turn circle for each reference trajectory of the one or more reference trajectories, the plane of motion of each reference trajectory of the one or more reference trajectories including a current position of the reference trajectory, the plane of motion aligned to an orientation of a current velocity of the reference trajectory, and the plane of motion aligned to the orientation of a current acceleration of the reference trajectory, the turn circle of each reference trajectory of the one or more reference trajectories embedded within the plane of motion of the one or more reference trajectories, the turn circle of each reference trajectory of the one or more reference trajectories aligned with the current position of the reference trajectory, the turn circle of each reference trajectory of the one or more reference trajectories tangential to the current velocity of the reference trajectory, the turn circle of each reference trajectory of the one or more reference trajectories aligned with curvature matching the reference trajectory;
filter the plane of motion of each reference trajectory of the one or more reference trajectories using a filtering model configured to eliminate unnecessary rotation of the plane of motion; and
determine one or more offset planes of motion and turn circles, the one or more offset planes of motion and turn circles including an offset to a goal position, the one or more offset planes of motion and turn circles including an offset to a guidance offset determined by the one or more controllers, the one or more offset planes of motion and turn circles further including an offset to the vehicle.

4. The system of claim 3, wherein the one or more controllers are further configured to:
guide the vehicle using a three-dimensional non-linear guidance logic, the three-dimensional non-linear guidance logic configured to operate in three dimensions of position, the three-dimensional non-linear guidance logic configured to utilize all possible position values of at least one of the vehicle or the one or more reference trajectories, the three-dimensional non-linear guidance logic configured to use the one or more offset planes of motion and turn circles.

5. The system of claim 3, wherein the one or more controllers are further configured to:
guide the vehicle using an axial guidance logic, the axial guidance logic configured to influence the position of the vehicle in a forward to aft dimension relative to the one or more reference trajectories, the axial guidance logic configured to use at least one of a commanded speed, a guidance offset perpendicular to the velocity of the one or more reference trajectories within the plane of motion, a guidance offset perpendicular to the velocity of the one or more reference trajectories and perpendicular to the plane of motion, or a guidance offset perpendicular to the velocity of the one or more reference trajectories and perpendicular to the plane of motion.

6. The system of claim 1, wherein the decision engine forward simulates a controlled vehicle trajectory of the at least one controlled vehicle for each relative maneuver primitive of the one or more relative maneuver primitives for a plurality of maneuvering behaviors.

7. A method, the method comprising:
initiating one or more relative maneuver primitives stored in memory in response to a selection by a decision engine,
the decision engine configured to select a relative maneuver primitive of the one or more relative maneuver primitives for at least one controlled vehicle of one or more vehicles to execute, wherein the at least one controlled vehicle is configured to dynamically maneuver relative to one or more reference frames using the one or more relative maneuver primitives, wherein the one or more relative maneuver primitives are directed towards a plurality of maneuvering behaviors associated with maneuvering the at least one controlled vehicle,
the one or more relative maneuver primitives configured as a software function used to influence a trajectory of the at least one controlled vehicle of the one or more vehicles according to a maneuvering characteristic defined by a type of the one or more relative maneuver primitives and a plurality of input parameters;
continuously receiving the plurality of input parameters for the one or more relative maneuver primitives in response to the decision engine selection at one or more predetermined intervals of time, the plurality of input parameters including one or more initialization definition input parameters, one or more goal definition input parameters, one or more navigation state input parameters, one or more design input parameters, and one or more controlled vehicle performance envelope input parameters,
the one or more design input parameters including pre-configured behavioral characteristic data required to adapt the selected relative maneuver primitive to the at least one controlled vehicle and a predetermined operational scenario,
the one or more vehicle performance envelope input parameters including performance data defining a performance envelope of the one or more vehicles to constrain maneuvering of the at least one controlled vehicle of the one or more vehicles within the performance envelope of the one or more vehicles,
the one or more initialization definition input parameters including initialization data required to initialize an internal state of the one or more relative maneuver primitives to achieve an expected behavior after instantiation by the decision engine,
the one or more goal definition input parameters including a quasi-static definition of the expected behavioral of the one or more relative maneuver primitives, the quasi-static definition include a specified relative geometry to one of a reference point or a trajectory; and
generating one or more trajectory control signals at one or more predetermined intervals of time, the one or more trajectory control signals configured to dynamically maneuver the at least one controlled vehicle of the one or more vehicles relative to the one or more reference vehicles frames based on the decision engine selection and the plurality of received input parameters.

8. The method of claim 7, wherein the one or more relative maneuver primitives include at least one of:
far field pursuit, planned trajectory rendezvous, local level pursuit, in plane pursuit, or out of plane pursuit.

9. The method of claim 7, further comprising:
determining a plane of motion and turn circle for each reference trajectory of the one or more reference trajectories, the plane of motion of each reference trajectory of the one or more reference trajectories including a current position of the reference trajectory, the plane of motion aligned to the orientation of a current velocity of the reference trajectory, and the plane of motion aligned to an orientation of a current acceleration of the reference trajectory, the turn circle of each reference trajectory of the one or more reference trajectories embedded within the plane of motion of the one or more reference trajectories, the turn circle of each reference trajectory of the one or more reference trajectories aligned with the current position of the reference trajectory, the turn circle of each reference trajectory of the one or more reference trajectories tangential to the current velocity of the reference trajectory, the turn circle of each reference trajectory of the one or more reference trajectories aligned with curvature matching the reference trajectory;
filtering the plane of motion of each reference trajectory of the one or more reference trajectories using a filtering model configured to eliminate unnecessary rotation of the plane of motion; and
determining one or more offset planes of motion and turn circles, the one or more offset planes of motion and turn circles including an offset to a goal position, the one or more offset planes of motion and turn circles including an offset to a guidance offset determined by the one or more controllers, the one or more offset planes of motion and turn circles further including an offset to the vehicle.

10. The method of claim 9, further comprising:
guiding the vehicle using a three-dimensional non-linear guidance logic, the three-dimensional non-linear guidance logic configured to operate in three dimensions of position, the three-dimensional non-linear guidance logic configured to utilize all possible position values of at least one of the vehicle or the one or more reference trajectories, the three-dimensional non-linear guidance logic configured to use the one or more offset planes of motion and turn circles.

11. The method of claim 9, further comprising:
guiding the vehicle using an axial guidance logic, the axial guidance logic configured to influence the position of the vehicle in a forward to aft dimension relative to the one or more reference trajectories, the axial guidance logic configured to use at least one of a commanded speed, a guidance offset perpendicular to the velocity of the one or more reference trajectories within the plane of motion, a guidance offset perpendicular to the velocity of the one or more reference trajectories and perpendicular to the plane of motion, or a guidance offset perpendicular to the velocity of the one or more reference trajectories and perpendicular to the plane of motion.

12. The method of claim 9, further comprising:
forward simulating, using the decision engine, a controlled vehicle trajectory of the at least one controlled vehicle for each relative maneuver primitive of the one or more relative maneuver primitives for a plurality of maneuvering behaviors.

* * * * *